(12) United States Patent
Pol et al.

(10) Patent No.: US 10,910,649 B2
(45) Date of Patent: Feb. 2, 2021

(54) METHODS OF MAKING ELECTRODES, ELECTRODES MADE THEREFROM, AND ELECTROCHEMICAL ENERGY STORAGE CELLS UTILIZING THE ELECTRODES

(71) Applicant: Purdue Research Foundation, West Lafayette, IN (US)

(72) Inventors: Vilas Ganpat Pol, West Lafayette, IN (US); Vinodkumar Etacheri, Kerala (IN)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 16/450,029

(22) Filed: Jun. 24, 2019

(65) Prior Publication Data
US 2019/0326597 A1    Oct. 24, 2019

Related U.S. Application Data

(62) Division of application No. 15/531,958, filed as application No. PCT/US2015/064779 on Dec. 9, 2015, now Pat. No. 10,333,145.
(Continued)

(51) Int. Cl.
*H01M 4/62* (2006.01)
*H01M 4/86* (2006.01)
(Continued)

(52) U.S. Cl.
CPC ........ *H01M 4/583* (2013.01); *H01M 4/625* (2013.01); *H01M 4/8673* (2013.01);
(Continued)

(58) Field of Classification Search
CPC ........ H01G 11/34; H01M 4/583; H01M 4/96; H01M 4/625; H01M 4/8803; H01M 4/926
See application file for complete search history.

(56) References Cited

U.S. PATENT DOCUMENTS

| 2009/0061312 A1* | 3/2009 | Zhamu | H01G 11/34 429/217 |
| 2014/0027677 A1* | 1/2014 | Lipka | H01B 1/24 252/502 |

FOREIGN PATENT DOCUMENTS

WO    WO-2012125839 A1 *    9/2012

OTHER PUBLICATIONS

Pol Upcycling: Converting Waste Plastics into Paramagnetic, conducting, solid, pure carbon Microspheres, Environ. Sci. Technol. vol. 44, No. 12, 2010, pp. 4753-4759) in view of Lipka (WO 2012/125839 A1 (Year: 2010).*

* cited by examiner

*Primary Examiner* — Matthew J Merkling
(74) *Attorney, Agent, or Firm* — Purdue Research Foundation

(57) ABSTRACT

Method of making interconnected layered porous carbon sheets with porosity within the carbon sheets and in-between the carbon sheets for use as an electrode. Method of making a metal-nanoparticle carbon composite, wherein metal particles are surrounded by shells made of amorphous carbon. Electrodes containing an amorphous carbon structure comprising a plurality of interconnected layered porous carbon sheets. Electrodes containing graphitic carbon structure with a surface area in the range of 5-200 $m^2/g$. Electrodes containing a metal-nanoparticle carbon composite comprising metal core-carbon shell like architecture and an amorphous structure, wherein metal particles are surrounded by shells made of amorphous carbon.

9 Claims, 25 Drawing Sheets

Related U.S. Application Data

(60) Provisional application No. 62/090,073, filed on Dec. 10, 2014.

(51) Int. Cl.
*H01M 4/88* (2006.01)
*H01M 4/90* (2006.01)
*H01M 4/92* (2006.01)
*H01M 4/96* (2006.01)
*H01M 4/583* (2010.01)

(52) U.S. Cl.
CPC ....... *H01M 4/8803* (2013.01); *H01M 4/9083* (2013.01); *H01M 4/926* (2013.01); *H01M 4/96* (2013.01)

Carbon microsheet of 1 micrometer thickness

METHODS OF MAKING ELECTRODES, ELECTRODES MADE THEREFROM, AND ELECTROCHEMICAL ENERGY STORAGE CELLS UTILIZING THE ELECTRODES

CROSS-REFERENCE TO RELATED APPLICATIONS

The present U.S. patent application is a divisional of U.S. patent application Ser. No. 15/531,958, filed May 31, 2017, which is a U.S. National Stage Application of PCT/US2015/064779, filed Dec. 9, 2015, which is related to and claims the priority benefit of U.S. Provisional Patent Application Ser. No. 62/090,073, filed Dec. 10, 2014. The contents of these applications are incorporated in their entirety herein by reference.

TECHNICAL FIELD

The present disclosure generally relates to electrodes suitable for use in electrochemical energy cells and methods of making them. The methods disclosed are environmentally benign and utilizes trashed packing materials.

BACKGROUND

This section introduces aspects that may help facilitate a better understanding of the disclosure. Accordingly, these statements are to be read in this light and are not to be understood as admissions about what is or is not prior art.

Rechargeable Li-ion batteries are integral part of modern portable electronic devices, medical implants, and electric vehicles. Their acceptability for a wide range of applications resulted from the increased energy density and high rate capabilities compared to other secondary batteries. Graphite is mostly used as the anode material for these rechargeable Li-ion batteries due to only 10% volume change during lithium intercalation into ordered graphitic planes, and improved electronic conductivity over alternative metal-oxide electrodes. Despite these advantages, the specific capacity of graphite is limited to 372 mAh/g, and high rate performances are not promising. These drawbacks of conventional graphite anodes seriously limit the energy and power density of Li-ion batteries. Moreover, lithiation occurs at lower potentials (<0.3 V vs Li+/Li), which results in possible short circuit and fire due to lithium dendrite growth.

Amorphous and hard carbons composed of disordered graphitic planes are promising alternatives to graphite anodes due to their improved specific capacity, and higher lithiation potential (offering improved safety). Such partially graphitic carbons can accommodate Li-ions in the disordered interlayers as well as in the micropores (micropores usually refer to pore sizes less than 2 nm) and offer excellent cycling stability and efficiency for rechargeable battery anodes. In addition, carbon nanomaterials such as nanoparticles, nanotubes, nanofibers, nanosheets, graphene, and fullerenes have also been used for Li-ion storage. Improved electrochemical performances of these 1-D and 2-D nanostructures resulted from the superior electronic and Li-ion diffusion due to their inimitable microstructure, high surface area, and porosity. However, these high surface area carbons experience severe capacity fading upon prolonged cycling due volume change during lithiation and extreme reactivity with acidic electrolyte. State of the art synthesis of these carbonaceous materials often involves the use of hydrocarbon precursors such as acetylene or coal. Complicated synthetic methods including chemical vapor deposition (CVD), electric arc discharge, and laser deposition are usually employed for the fabrication of carbon nanotubes and graphene. These complex methods that rely on hydrocarbon precursors could be commercially non-viable, environmentally non-benign and expensive.

Thus an unmet need exists for simple scalable and inexpensive synthetic methods for high capacity carbon electrodes for Li-ion batteries. Further it is desirable that such methods are relatively inexpensive and environmentally benign.

SUMMARY

A method of producing interconnected layered porous carbon sheets is disclosed. The method includes providing a quantity of porous starch-based packing peanuts, heating the quantity of porous starch-based packing peanuts to a temperature in the range of 300-1000° C. for a heating time period in an inert atmosphere resulting in a carbonaceous entity, and cooling the carbonaceous entity to room temperature, resulting in a plurality of interconnected layered porous carbon sheets with porosity within the carbon sheets and in-between the carbon sheets.

According to one embodiment of the method of producing interconnected layered porous carbon sheets, the inert atmosphere is one of nitrogen, argon and helium.

According to one embodiment of the method of producing interconnected layered porous carbon sheets, the heating time period is in the range of 1 minute to 3 hours.

According to one embodiment of the method of producing interconnected layered porous carbon sheets, each of the plurality of interconnected layered porous carbon sheets has a thickness less than 3 µm.

According to one embodiment of the method of producing interconnected layered porous carbon sheets, each of the plurality of interconnected layered porous carbon sheets has a width less than 200 µm.

According to one embodiment of the method of producing interconnected layered porous carbon sheets, wherein the plurality of interconnected layered porous carbon sheets have a surface area in the range of 10 $m^2/g$-400 $m^2/g$.

According to one embodiment of the method of producing interconnected layered porous carbon sheets, wherein the plurality of interconnected layered porous carbon sheets have a surface area in the range of 100 $m^2/g$-400 $m^2/g$.

According to one embodiment of the method of producing interconnected layered porous carbon sheets, the method includes the additional step of heating the plurality of interconnected layered porous carbon sheets to a temperature in the range of 1000-2800° C. in an inert atmosphere for a time period in the range of 1-5 hours, resulting in a graphitic carbon with a surface areas in the range of 5-200 $m^2/g$.

According to one embodiment of the method of producing interconnected layered porous carbon sheets, the method includes the additional step of heating the plurality of interconnected layered porous carbon sheets to a temperature of 200-350° C. in air for a time period in the range of 1-36 hours, resulting in a plurality of interconnected layered porous carbon sheets having a surface area in the range of 100-2000 $m^2/g$.

According to one embodiment of the method of producing interconnected layered porous carbon sheets, the method includes the additional step of heating the plurality of interconnected layered porous carbon sheets to a temperature in the range of 600-1000° C. in an inert atmosphere in the presence of an amount of potassium hydroxide catalyst for a time period in the range of 2-40 hours, resulting in the plurality of interconnected layered porous carbon sheets having a surface area in the range of 500-4000 m²/g.

According to one embodiment of the method of producing interconnected layered porous carbon sheets, wherein the method includes the additional step of heating the plurality of interconnected layered porous carbon sheets to a temperature in the range of 600-1000° C. in an inert atmosphere in the presence of an amount of potassium hydroxide catalyst for a time period in the range of 2-40 hours, resulting in the plurality of interconnected layered porous carbon sheets having a surface area in the range of 500-4000 m²/g, the ratio of the amount of carbon in the plurality of interconnected layered porous carbon sheets to the amount of potassium hydroxide catalyst is in the range of 1 to 20 by weight.

A method of producing a metal-nanoparticle carbon composite is disclosed. The method includes providing a quantity of polystyrene-based packing peanuts, dissolving the polystyrene-based packing peanuts into an organic solvent; providing a metal-organic catalyst containing a metal, the metal-organic catalyst being capable of catalyzing conversion of polystyrene-based packing peanuts into carbon nanoparticles in presence of heat, forming an admixture of the quantity of polystyrene-based packing peanuts and the catalyst, heating the admixture to a temperature in the range of 300-1000° C. for a heating time period in an inert atmosphere, resulting in a carbon-metal entity containing the metal, and cooling the carbon-metal composite to room temperature, resulting in a metal-nanoparticle carbon composite, wherein metal particles are surrounded by a shells made of amorphous carbon.

According to one embodiment of the method of producing metal-nanoparticle carbon composite, the inert atmosphere is one of nitrogen, argon and helium.

According to one embodiment of the method of producing metal-nanoparticle carbon composite, the metal-nanoparticle carbon composite has a surface area in the range of 10 m²/g-400 m²/g.

According to one embodiment of the method of producing metal-nanoparticle carbon composite, the metal-nanoparticle carbon composite has a surface area in the range of 100 m²/g-400 m²/g.

According to one embodiment of the method of producing metal-nanoparticle carbon composite, the method includes an additional step of heating the metal-nanoparticle carbon composite to a temperature in the range of 1000 to 2800° C. in an inert atmosphere for a time period in the range of 1-5 hours, resulting in graphitic carbon having a surface area in the range of 5-200 m²/g.

According to one embodiment of the method of producing metal-nanoparticle carbon composite, the method includes an additional step of heating the metal-nanoparticle carbon composite to a temperature in the range of 600-1000° C. in an inert atmosphere in the presence of an amount of potassium hydroxide catalyst for a time period in the range of 2-40 hours, resulting in the metal-nanoparticle carbon composite having a surface area in the range of 500-4000 m²/g.

According to one embodiment of the method of producing metal-nanoparticle carbon composite, wherein the method includes an additional step of heating the metal-nanoparticle carbon composite to a temperature in the range of 600-1000° C. in an inert atmosphere in the presence of an amount of potassium hydroxide catalyst for a time period in the range of 2-40 hours, resulting in the metal-nanoparticle carbon composite having a surface area in the range of 500-4000 m2/g, the ratio of the amount of carbon in the metal-nanoparticle carbon composite to the amount of potassium hydroxide catalyst is in the range of 1 to 20 by weight.

According to one embodiment of the method of producing metal-nanoparticle carbon composite, the catalyst is a salt of a transition metal According to one embodiment of the method of producing metal-nanoparticle carbon composite, wherein the catalyst is a salt of a transition metal, the transition metal is cobalt or nickel.

An electrode suitable for use as an electrode in an electrochemical energy storage cell is disclosed. The electrode contains an amorphous carbon structure comprising a plurality of interconnected layered porous carbon sheets.

According to one embodiment of an electrode suitable for use as an electrode in an electrochemical energy storage cell, wherein the electrode contains an amorphous carbon structure comprising a plurality of interconnected layered porous carbon sheets, each of the plurality of interconnected layered porous carbon sheets has a thickness less than 3 μm.

According to one embodiment of an electrode suitable for use as an electrode in an electrochemical energy storage cell, wherein the electrode contains an amorphous carbon structure comprising a plurality of interconnected layered porous carbon sheets, each of the plurality of interconnected layered porous carbon sheets has a width less than 200 μm.

According to one embodiment of an electrode suitable for use as an electrode in an electrochemical energy storage cell, wherein the electrode contains an amorphous carbon structure comprising a plurality of interconnected layered porous carbon sheets, the plurality of interconnected layered porous carbon sheets have a surface area in the range of 10 m²/g-4000 m²/g.

According to one embodiment of an electrode suitable for use as an electrode in an electrochemical energy storage cell, wherein the electrode contains an amorphous carbon structure comprising a plurality of interconnected layered porous carbon sheets, the electrode has a specific capacity in the range of 300-600 mAh/g.

An electrode suitable for use as an electrode in an electrochemical energy storage cell is disclosed. The electrode contains graphitic carbon structure with a surface area in the range of 5-200 m2/g.

An electrode suitable for use as an electrode in an electrochemical energy storage cell is disclosed. The electrode contains a metal-nanoparticle carbon composite, wherein metal particles are surrounded by shells made of amorphous carbon.

According to one embodiment of an electrode in an electrochemical energy storage cell, wherein the electrode contains a metal-nanoparticle carbon composite comprising metal particles surrounded by shells made of amorphous carbon, the metal-nanoparticle carbon has a surface area in the range of 5-4000 m²/g.

According to one embodiment of an electrode in an electrochemical energy storage cell, wherein the electrode contains a metal-nanoparticle carbon composite comprising metal particles surrounded by shells made of amorphous carbon, the electrode has a specific capacity in the range of 300-600 mAh/g.

An electrochemical energy storage cell is disclosed. The electrochemical energy storage cell includes an electrode containing an amorphous carbon structure comprising a plurality of interconnected layered porous carbon sheets.

An electrochemical energy storage cell is disclosed. The electrochemical energy storage cell includes an electrode containing a metal-nanoparticle carbon comprising metal core-carbon shell like architecture and an amorphous structure.

BRIEF DESCRIPTION OF DRAWINGS

While some of the figures shown herein may have been generated from scaled drawings or from photographs that are scalable, it is understood that such relative scaling within a figure are by way of example, and are not to be construed as limiting.

DETAILED DESCRIPTION

Figure 1A:
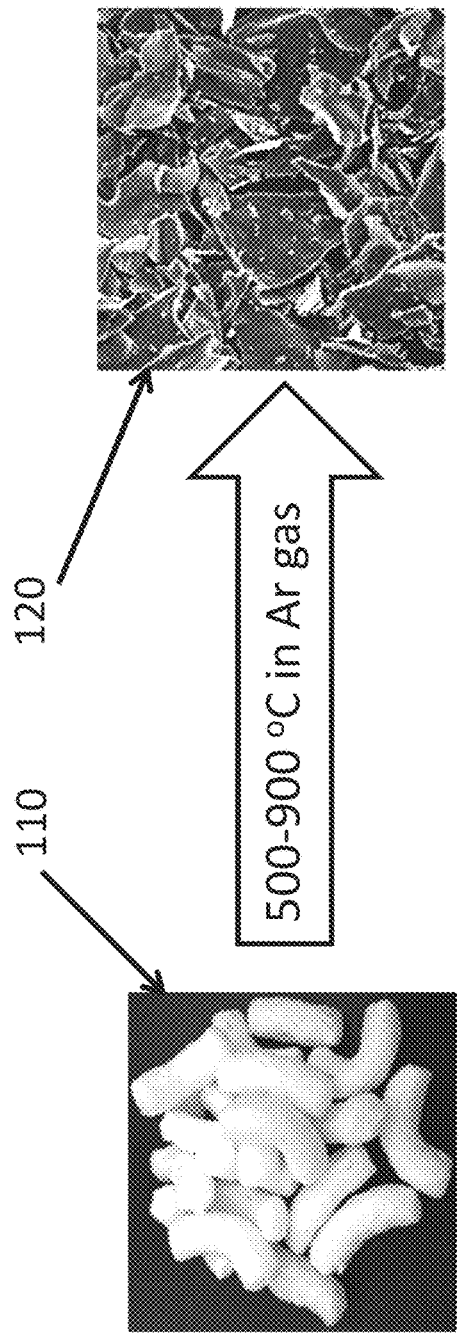
FIG. 1A is a schematic representation of carbonizing starch-based packing peanuts into carbon microsheets.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, such alterations and further modifications in the illustrated device, and such further applications of the principles of the disclosure as illustrated therein being contemplated as would normally occur to one skilled in the art to which the disclosure relates.

The present disclosure provides methods to convert starch and polystyrene-based waste packing peanuts are into carbon microsheets and nanoparticles, respectively for use in electrochemical energy storage cells.

Environmental pollution caused by waste packaging materials is a serious global issue that needs to be urgently addressed. Millions of tons of plastic waste are generated worldwide every year, and it is critical to find efficient methods for their disposal and recycling. Recent studied demonstrated that plastic containers, bags, and packing peanuts constitute 31% of the municipal waste created in the U.S., and only ≈40% of these packaging materials are recycled. Industrial and commercial waste (≈7.6 billion tons/year) generated in the U.S. also contains a substantial amount of plastics. Although packing peanuts are used worldwide as a perfect solution for shipping, they are notoriously difficult to recycle and break down. Currently, only a very small fraction (≈10%) of the packing peanuts is being recycled. Due to their low density (huge contairs are required for transportation), shipment to a recycler is expensive, and does not provide profit on investment. As a result, most often packing peanuts end up in landfills, where they stay intact for generations. Chemical moieties such as heavy metals, chlorides, phthalates etc. present in the packing peanuts can be easily leached into the surrounding media and deteriorate soil/water quality. Marine litter often consists of 60-80% of plastic debries, and a large number of marine animal species are harmed/killed by these solid plastic waste ended up in the ocean. They also threatens several plant/animal species by filling up and contaminating the coastal area. The starch based packing peanuts, which is an alternative of polystyrene based peanuts also contain chemicals and detergents that can contaminate soil and aquatic ecosystem.

In this disclosure, methods are described to upcycle polystyrene and starch based packing peanuts by to carbon nanoparticles and microsheets respectively for electrochemical energy storage, especially in Li-ion batteries. Although previous attempts have been reported for the inexpensive synthesis of carbon through upcycling of waste plastic bags, scalability remained as an issue due to the use of high-pressure containers. Synthetic methods described in this disclosure offer an environmentally benign, scalable, straightforward, and inexpensive solid-state method for the upcycling of packaging materials in to carbonaceous materials for electrochemical energy storage. This methods of this disclosure do not use pressurised containers, which makes these methods attractive for the industrial production of carbonaceous materials. The present disclosure describes carbonization of starch based waste packing peanuts resulted into carbon sheets and polystyrene based peanuts form carbon into carbon nanoparticles. Carbon microsheets and nanoparticles are for the first time synthesized through upcycling of starch and polystyrene based waste packing peanuts. Electrodes composed of these carbonaceous materials exhibited excellent Li, and Na-ion storage performances (specific capacities, rate performance, and long-term cycling stability) compared to the commercial carbon anodes. Amorphous nature of these carbon electrodes resulted in a superior specific capacity of 410 mAh/g, which greater than the theoretical capacity of carbon (372 mAh/g). Superior electrochemical properties are attributed to the unique 2-D and 1-D architectures with optimum porosity and amorphous nature that allows improved solid-state and interfacial Li-ion diffusion kinetics. Microscopic and spectroscopic investigation of the cycled electrodes proved that the microstructures responsible for superior electrochemical performances are preserved after many charge-discharge cycles. The synthetic method described herein is inexpensive, environmentally benign, and scalable, compared to complex conventional methods used for the synthesis of carbonaceous materials.

Figure 1B:
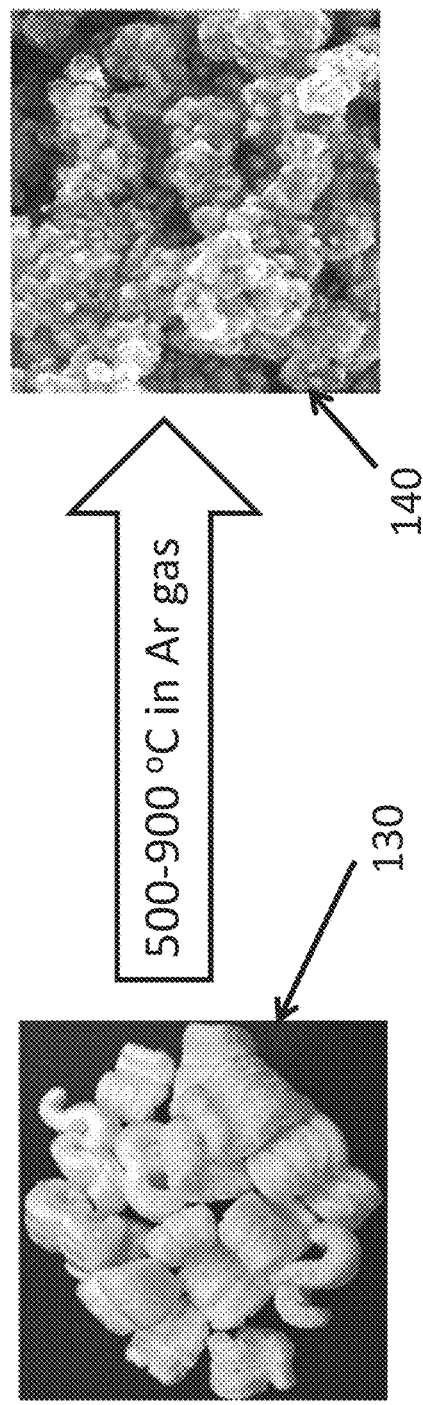
FIG. 1B is a schematic representation of carbonizing polystyrene-based peanuts into nanoparticle composites.

FIG. 1A is a schematic representation of carbonizing starch-based packing peanuts into carbon microsheets. FIG. 1B is a schematic representation of carbonizing polystyrene-based peanuts into nanoparticle composites, and will be described in detail later in this description. Referring to FIG. 1A, starch-based packing peanuts 110 are heated to a temperature in the range of 500-900° C. in an atmosphere of flowing Argon gas to produce carbon microsheets 120. There are other steps in this process in addition to heating in Argon atmosphere which will be described below. The process involves providing a quantity of porous starch-based packing peanuts, heating the quantity of porous starch-based packing peanuts to a temperature in the range of 500-900° C. for about 2 hours in argon flow. This results in a carbonaceous entity, which is then cooled to room temperature. This results in several interconnected layered porous carbon sheets with porosity within the carbon sheets and in-between the carbon sheets. The heating and cooling rates were 10° C./min. For purposes of this disclosure room temperature can be understood to be in the non-limiting range of 20-35° C. Instead of argon, an inert atmosphere can be used. Non-limiting examples of inert atmosphere suitable for this purpose include argon, nitrogen, and helium. A non-limiting temperature range for the heating temperature is 300-1000° C. while a non-limiting range for the heating time is 1 minute to 3 hours. The obtained carbon was then ground well in an agate mortar) to form carbon porous microsheets. These carbon microsheets are hereafter identified as CS-500, CS-600, CS-700, CS-800, and CS-900, where the numbers refers to the temperature in degrees centigrade of the heating temperature used to produce the carbonaceous entity form the starch-based peanuts. Micrometrics ASAP 2000 instrument was used for the measurement of textural characteristics (specific surface area, mean pore size, porous volume) by nitrogen sorption at 77 K. Multipoint specific surface area calculations are performed using the linear portion (P/P0=0.05-0.2) of the Brunauer-Emmett-Teller (BET) model. Adsorption branch of the Barret-Joyner-Halenda (BJH) model was used for the measurement of pore-diameter and pore volumes.

Composite carbon anodes for Li, and Na-ion batteries were fabricated by thoroughly mixing 70% active carbon, 20% Super-P carbon black (conductive additive), and 10% PVDF (binder) in N-methyl pyrolidone (solvent) followed by coating on a copper foil using a doctor blade. Electrochemical tests are performed on a coin-type 2032 half-cells containing carbon working electrode, Celgard 2500 polypropylene separator, and Li-foil counter electrode. Electrolyte for the L-ion system consists of 1 M LiPF6 in a 1:1 mixture of ethylene carbonate (EC)/dimethyl carbonate (DMC). For the Na-ion system, $NaClO_4$ (1 M) dissolved in propylene carbonate (PC) was used as the electrolyte. A glove box filled with high-purity argon (99.99%), and equipped with oxygen and moisture sensors/absorbers ($O_2$ and $H_2O$ content<1 ppm) is used for assembling the cells. Test cells were Galvanostatically charged and discharged at various current densities (in the voltage range of 3 V-0 V) using a computer controlled Neware battery tester. Other electrochemical tests such as cyclic voltammetry (CV) and electrochemical impedance spectroscopy (EIS) were performed with a Gamry Reference-600 electrochemical workstation. Electrochemical performances of the carbon electrodes were compared with Conoco Philips commercial carbon electrode. All electrochemical experiments were triplicated and, the results obtained were less than 5% error limit. All potentials mentioned in this disclosure are vs. Li/Li+ unless otherwise stated.

Figures 2A, 2B:
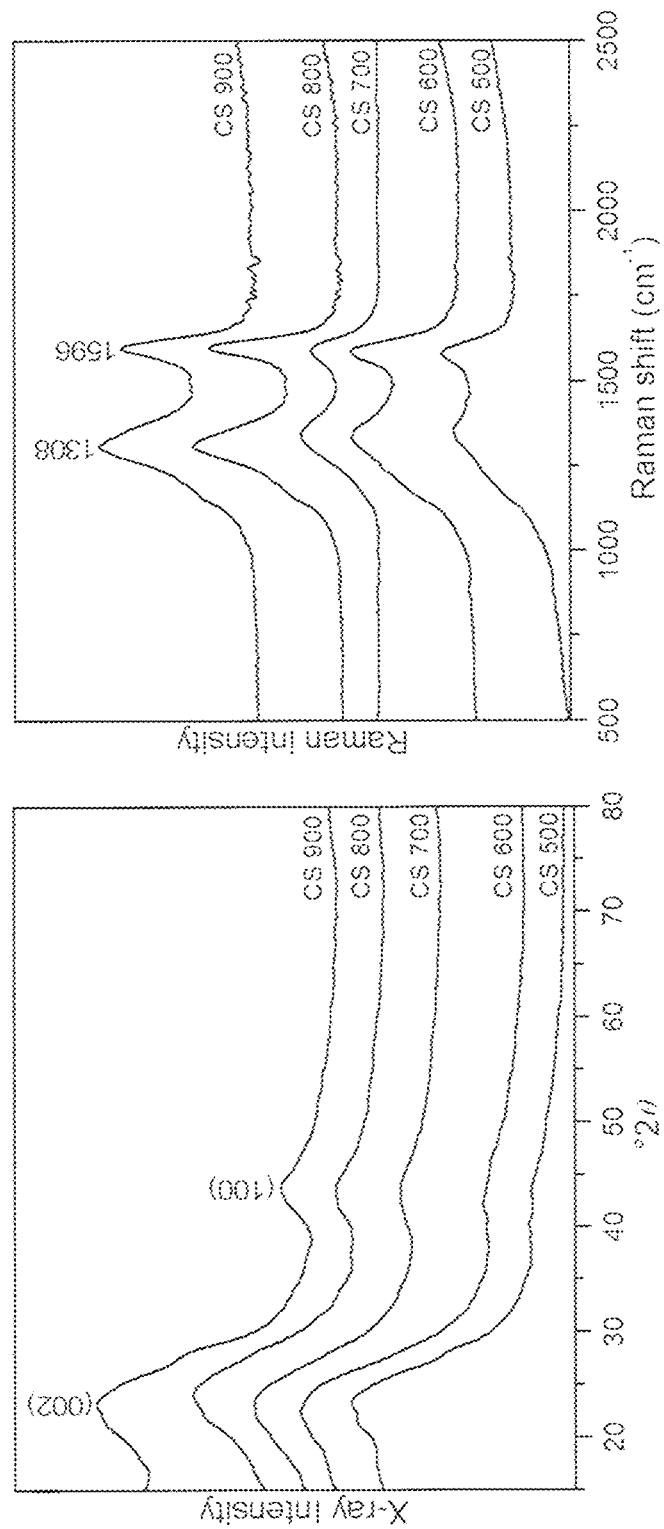
FIG. 2A shows X-ray diffraction patterns the packing peanut derived carbon microsheets prepared at various temperatures.
FIG. 2B shows Raman spectra of the carbon microsheets prepared at various temperatures.

FIG. 2A shows X-ray diffraction patterns of the packing peanut derived carbon microsheets prepared at various temperatures. Well-resolved peaks at 23° and 43° are characteristic of (002) and (100) graphitic planes. Broad diffraction peaks suggest low degree of graphitization in these carbon microsheets since they are fabricated at a lower temperature. The d-spacing calculated from the (002) peak of carbon microsheet is 0.37 nm, which is slightly larger than the distance between the individual graphene layers of graphite (typically 0.344-0.355 nm). Intensities of the broad (002) and (100) peaks increased at higher carbonization temperatures of 800 and 900° C.; implying the formation of a turbostratic or disordered structure.

FIG. 2B shows Raman spectra of the carbon microsheets prepared at various temperatures. Referring to FIG. 2B, Raman spectra of the carbon microsheets prepared at various temperatures exhibited distinctive D, and G peaks at Raman bands at 1308 and 1596 cm$^{-1}$, respectively. The D-band belongs to A1g symmetry is ascribed to the disordered carbon/structural defects, and G-band represents Raman active E2g mode of the graphitic layers (sp2 bonded carbon atoms). High intensity of the D-band compared to G-band confirmed the amorphous nature of the carbon microsheets. The relative intensity of D and G bands (ID/IG) is 0.93 for the low temperature sample CS-500, and 1.05 for the high temperature sample CS-900. However, the full width at half-maximum (FWHM) of the D and G-band decreased with an increase in calcinations temperature, indicating the formation of a planar graphitic structure. Phase purity of the packing peanut derived carbon sheets is also evident from the XRD and Raman signals.

Figure 3B:
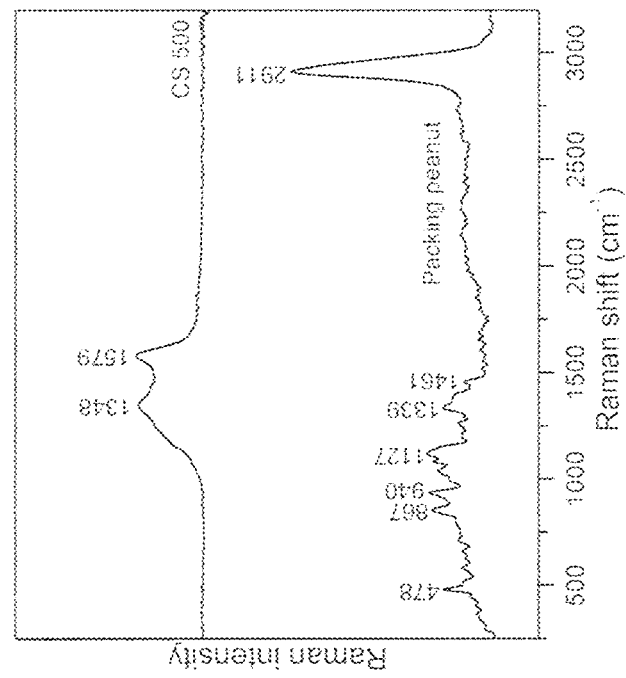
FIG. 3B shows Raman spectra of packing peanuts before and after carbonization at 500° C.
Figure 3A:
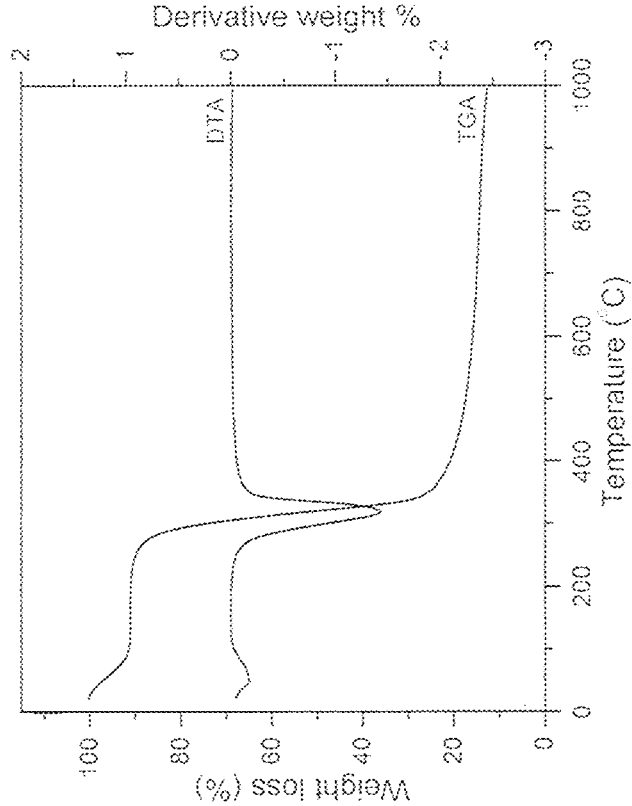
FIG. 3A is a plot of weight loss vs. temperature obtained in a combined thermogravimetric analysis and differential thermal analysis of starch based packing peanuts.

FIG. 3A is a plot of weight loss vs. temperature obtained in a combined thermogravimetric analysis and differential thermal analysis of starch based packing peanuts. First weight loss/endothermic peak at 80° C. resulted from the removal of adsorbed water, followed by the second set of peaks around 325° C. due to the carbonization of starch. Absence of any significant weight loss after 400° C. confirmed the complete formation of carbon sheets after leaving water and hydrocarbons. Complete conversion of starch to carbon during heat treatment of the packing peanuts was furthermore proved by Raman spectroscopy. Spectral characteristics of starch indicate a high intensity peak at 2911 $cm^{-1}$ corresponds to the CH stretching of the amylose and amylopectin components of starch.

FIG. 3B shows Raman spectra of packing peanuts before (indicated as packing peanut) and after carbonization at 500° C. (indicated as CS 500). Raman bands in the range of 1500-1200 $cm^{-1}$ represent resulted from the coupled vibrations of hydrogen atoms. For instance 1461 $cm^{-1}$ signal is characteristic of CH, CH2, and COH deformations. Stretching of C—O bonds and C—O—H deformations caused the 1339 $cm^{-1}$ signal. The fingerprint region between 1200 and 800 $cm^{-1}$ is distinctive of C—C/C—O stretching, and C—O—C deformation of the glycosidic linkages. Finally the peak at 478 $cm^{-1}$ denotes C—O and C—C—C deformations. Disappearance of these Raman bands corresponding to the various functional groups of starch after carbonization at 500° C. confirmed their complete conversion to phase-pure carbon.

Figure 4B:
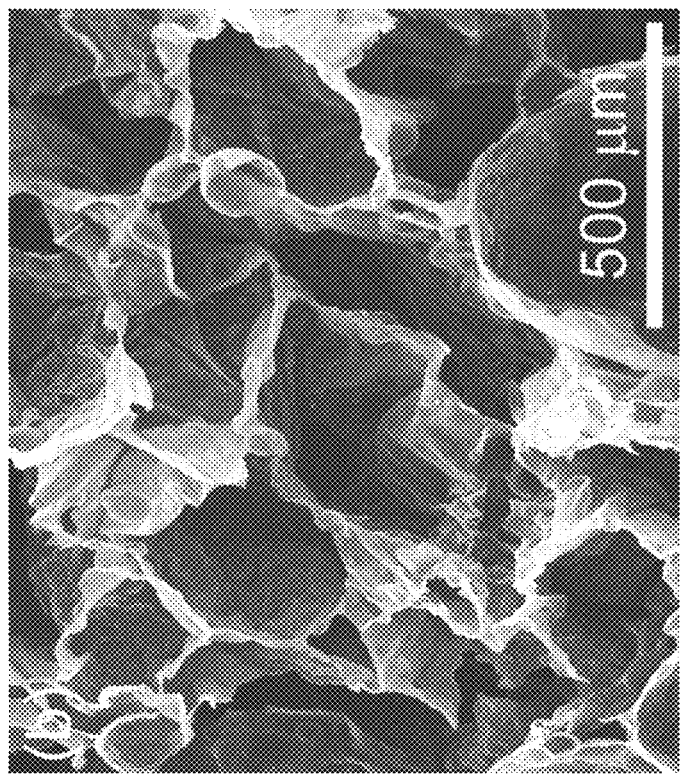
FIGS. 4A and 4B show SEM images of a starch based packing peanut and a starch-based packing peanut carbonized at 600° C. respectively.
Figure 4A:
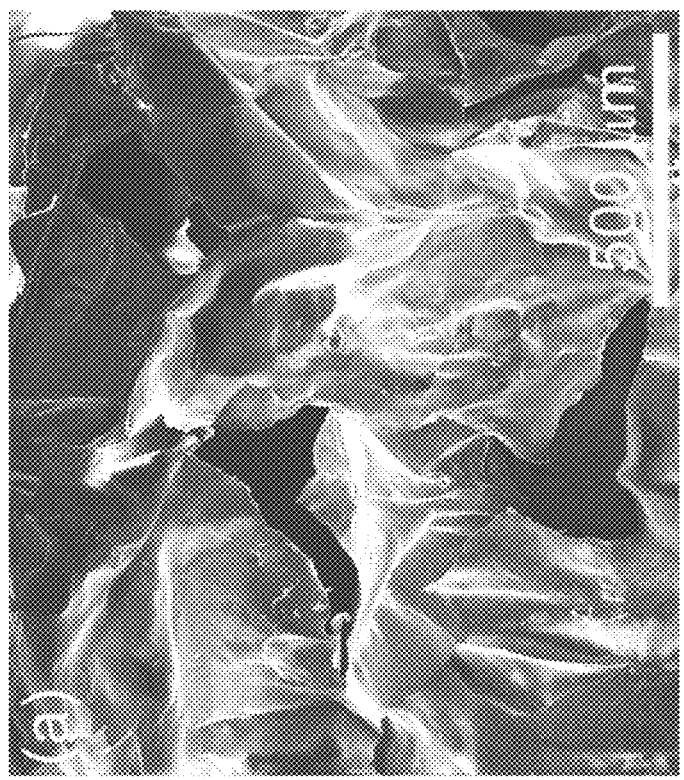
Figure 5B:
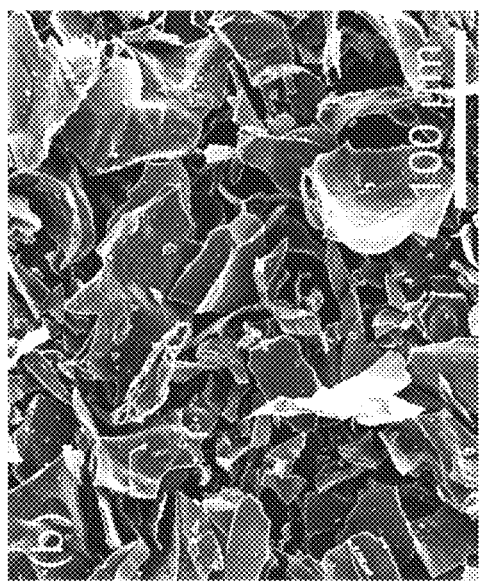
FIGS. 5A through 5D show carbon microsheets of this disclosure at various magnifications.
Figure 5A:
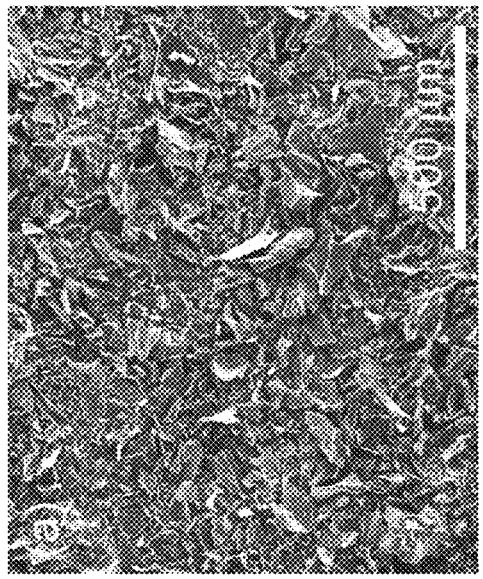
Figure 5D:
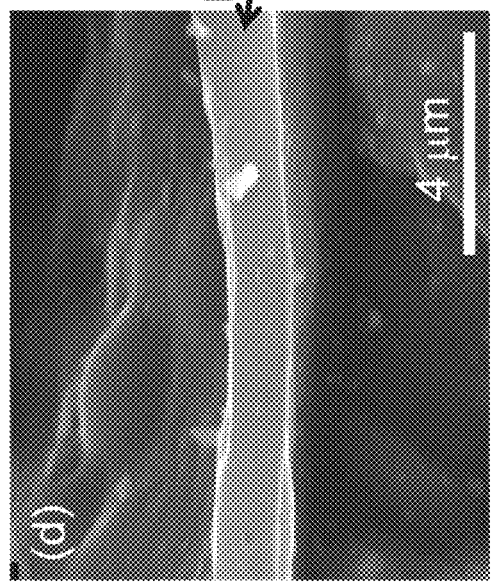
Figure 5C:
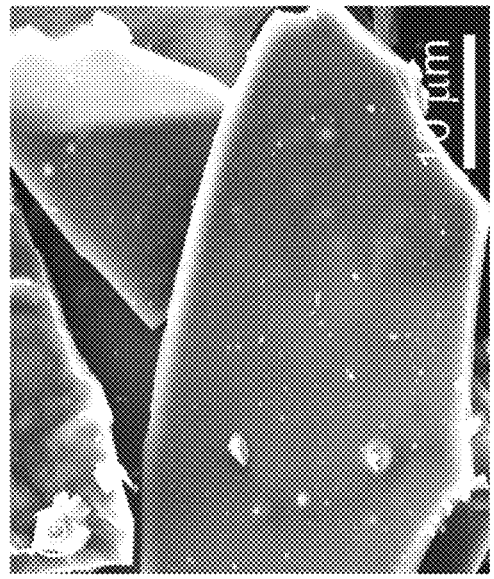

Microstructures of the packing peanuts and the formation of carbon microsheets were investigated using scanning electron microscopy FIGS. 4A and 4B show Scanning Electron Microscope (SEM) images of a starch based packing peanut and a starch-based packing peanut carbonized at 600° C. respectively. Referring to FIG. 4A, as received raw starch-based packing peanut consists of an interconnected network of microsheets which was preserved during heat. Referring to FIG. 4B, the carbonized packing peanut is composed of 3-D interconnected carbon microsheets resembling the carbon aerogel microstructure. At higher magnifications, micropores will be able to be detectable. FIGS. 5A through 5D show carbon microsheets of this disclosure at various magnifications. Shown in FIG. 5D is a carbon microsheet of this disclosure with an approximate thickness of 1 μm. Irregular shaped carbon microsheets obtained after grinding the carbonized packing peanuts possesses an average width of 50-100 μm, and a uniform thickness of 1 μm. A preferred upper limit for the width of these microsheets is 200 μm, while a preferred upper limit for the thickness of these microsheets is 3 μm. Other values are possible depending on the processing conditions and the initial microstructure of the starting peanuts material. High resolution images verified that the edges and surfaces of these sheets are very smooth, which is beneficial for uniform current distribution and safe long-term operation of Li-ion batteries. Textural properties of the carbon nanosheets were found to be highly dependent on the processing temperature as shown in Table 1 below:

TABLE 1

Textural properties of carbon microsheets (CS)

| Composition | Surface area ($m^2/g$) | Pore size (nm) | Pore volume cc/g |
|---|---|---|---|
| CS-600 | 158 | 2.08 | 0.08 |
| CS-800 | 323 | 3.21 | 0.03 |
| CS-900 | 387 | 3.64 | 0.02 |

The surface areas of carbon microsheets produced by the methods of this disclosure are listed in Table 1. A non-limiting range for the specific surface area of the carbon microsheets produced by the method described above is 10 $m^2/g$-400 $m^2/g$, with a preferred range being 100 $m^2/g$-400 $m^2/g$. These results established that heat treatment at higher temperatures significantly improve the surface area, pore-size and pore-volume of carbon microsheets. Thus, it is evident from the above observations that carbonization of starch based packing peanuts resulted in the formation of amorphous, and mesoporous (pore sizes of 2-50 nm) carbon microsheets.

It should be noted that the interconnected layered porous carbon sheets produced by the above methods can be heated to a temperature of 1000-2800° C. in an inert atmosphere for a time period in the range of 1-5 hours, resulting in a graphitic carbon with a surface areas in the range of 5-200 $m^2/g$. High temperature treated carbon microsheet decreases their surface area due to collapse of porous architecture and increased graphitic nature. Such sheets have lower first cycle coulombic inefficiency when acting as an anode of rechargeable batteries. It should also be noted that the interconnected layered porous carbon sheets produced by the method that includes the step of heating the starch-based packing peanuts to temperature in an inert atmosphere for a period of time can be further heated to a temperature in the range of 200-350° C. in an air for a time period in the range of 1-5 hours, resulting in interconnected layered highly porous carbon sheets having a surface area in the range of 100-2000 $m^2/g$. Such air activated carbon sheets have modified surface bonds increasing the surface area and could be useful for higher Li insertion. Such activated carbon samples are useful for storage of $CO_2$ gas as well.

It should be further noted that the interconnected layered porous carbon sheets produced by the method that includes the step of heating the starch-based packing peanuts to temperature in to a temperature in the range of 600-1000° C. in an inert atmosphere in the presence of an amount of potassium hydroxide catalyst for a time period in the range of 2-40 hours, resulting interconnected layered porous carbon sheets having a surface area in the range of 500-4000 $m^2/g$. Potassium hydroxide reacts with the surface oxygen atoms, generating highly porous structures favorable for trapping CO2 gas. In this process step of hating the carbon microsheets in the presence of potassium hydroxide a preferred range for the ratio of the amount of carbon in the interconnected layered porous carbon sheets to the amount of potassium hydroxide catalyst is in the range of 1 to 20 by weight. The ratio of KOH with starch defines how much KOH is available at high temperature to react with surface carbons. The above mentioned additional processing steps can used individually or in combination or in two steps.

Figures 6A, 6B:
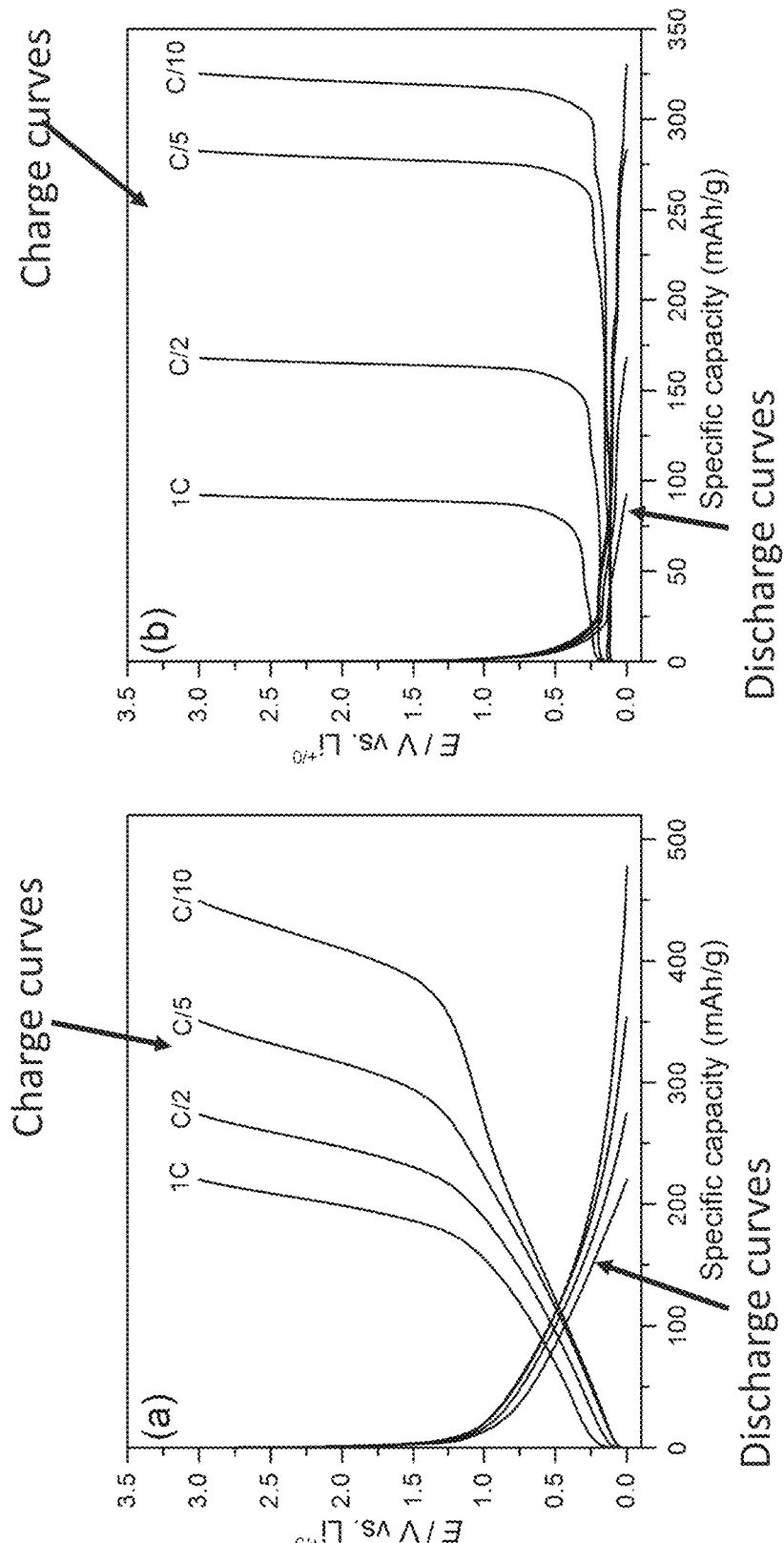
FIGS. 6A and 6B show discharge and charge profiles respectively of the electrochemically most active carbon sheet (CS-600) and commercial carbon electrode at various current densities.

FIGS. 6A and 6B show discharge and charge profiles respectively of the electrochemically most active carbon sheet (CS-600) and commercial carbon electrode at various current densities. (Note: 600° C. has been determined to be an optimized temperature to generate disordered, amorphous, defective carbon structure accommodating higher amounts of lithium ions eventually producing elevated lithium storage.) In FIGS. 6A and 6B and in subsequent figures and description, current density is represented in terms of C, where C is the current density required to fully charge or discharge the battery in one hour. In the notation employed C/2 means current density required to charge/or discharge the battery in 2 hours. Similarly, C/5 means current density required to charge/or discharge the battery in 5 hours, and so on. Electrodes composed of porous carbon microsheets exhibited superior Li-ion storage electrochemical performance compared to the commercial carbon electrode. At a current density of 0.1 C, CS-600 achieved a remarkably higher discharge capacity of 500 mAh/g, which is 130 mAh/g higher than the theoretical capacity of carbon. Under similar experimental conditions, commercial carbon achieved only a specific capacity of 330 mAh/g. Notable differences in the lithiation-delithiation process of these carbon samples are clearly visible form their voltage profile shapes. In the case of commercial carbon, discharge profiles consists of a flat plateau around 0.1 V. Whereas carbon microsheets showed a slopping discharge profile, and most of the capacity was accumulated at a higher voltage range compared to the commercial carbon. Such slopping lithiation profiles have been previously reported for amorphous and turbostatically disordered carbon electrodes. It should be noted that many plots appearing in FIG. 6A through FIG. 23 have designations and nomenclature well understood by those of ordinary skill in the art.

Figures 7A, 7B:
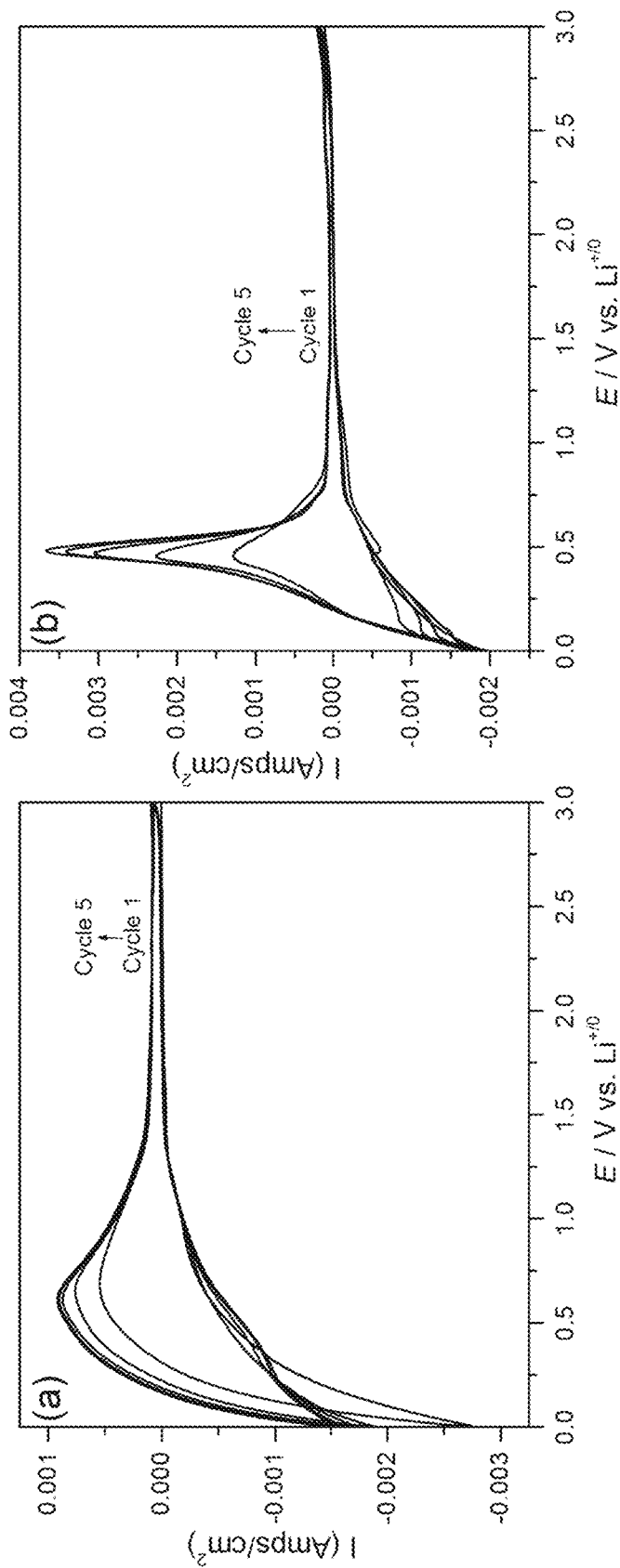
FIGS. 7A and 7B show plots of cyclic voltammetry of CS-600, and commercial carbon respectively in a Li-ion half-cell.

In order to gain further understanding of the electrochemical processes, cyclic voltammetric analysis in the 3.0-0 V voltage range was performed on CS-600 and commercial carbon. FIGS. 7A and 7B show plots of cyclic voltammetry of CS-600, and commercial carbon respectively in a Li-ion half-cell. Referring to FIG. 7A the first two cathodic scans of carbon sheets CS-600 consist of a broad band starting at 1.3 V and extending to 0 V, which represents the simultaneous lithiation of carbon ($C_6$+Li++e−↔$LiC_6$) and secondary electrolyte formation (SEI) formation. During initial charging process the electrolyte decomposes on the surface layer and generates mentioned protecting SEI that provides longer charge-discharge battery life. After two cathodic-anodic scans, this cathodic signal split into a broad band centered at 0.45 V, and a sharp tail extending to 0 V. This two-step cathodic response is attributed to the Li-ion intercalation to amorphous and graphitic components of the carbon microsheets. Voltammetric response also demonstrated that only a small fraction (approximately 5%) of the total specific capacity was contributed by the graphitic phase of carbon sheets. In the case of commercial carbon anode, first cathodic curve exhibited a band at 0.48 V corresponding to SEI formation, followed by the sharp band extending to 0 V for lithiation. After two cathodic scans, well defined bands characteristic of the Li-intercalation into graphitic layers appeared at 0.15 V. Anodic peaks characteristic of the delithiation from carbon sheets and commercial carbon appeared at 0.60, and 0.48 V, respectively. It is worth to note that the Li-intercalation at relatively higher potentials make our carbon microsheets a much safer anode (that eliminate the Li-dendrite growth issue) compared to the commercial graphitic carbon.

Figure 8:
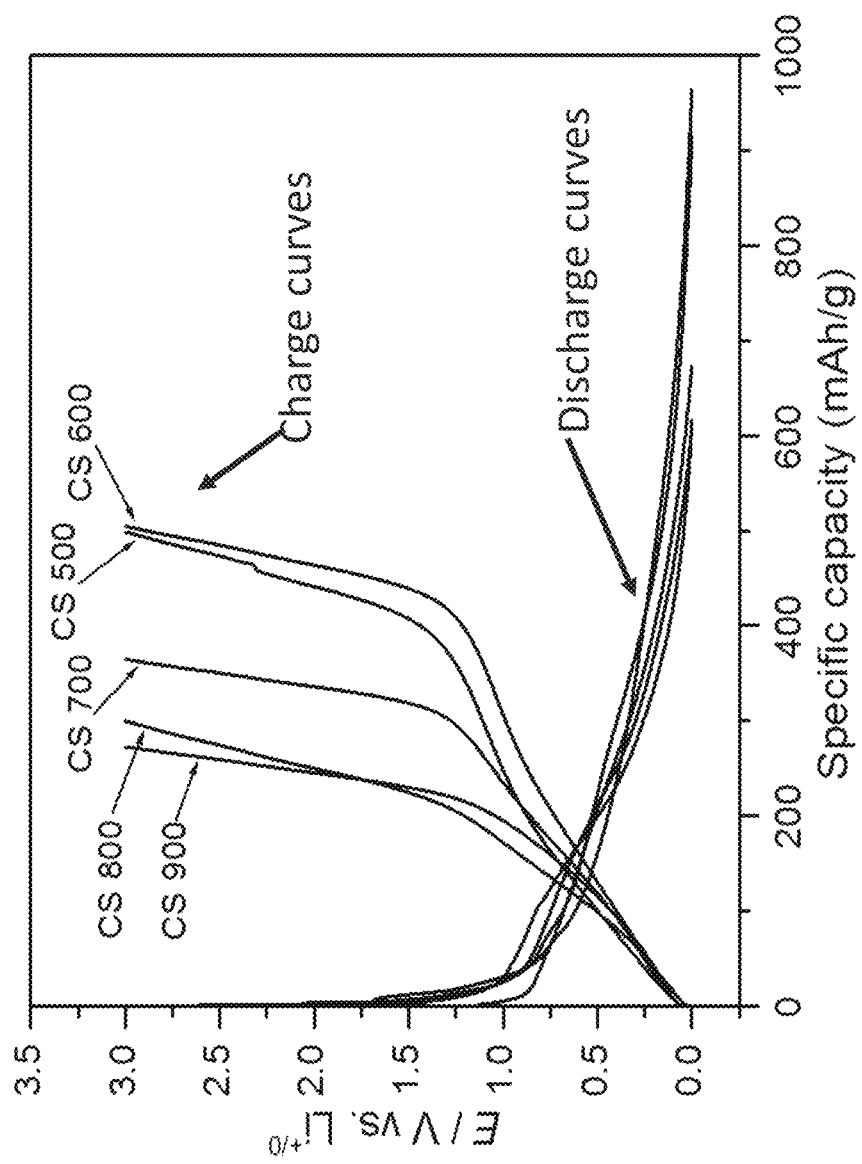
FIG. 8 shows first discharge-charge profiles of carbon microsheets prepared at various temperatures.

FIG. 8 shows first discharge-charge profiles of carbon microsheets prepared at various temperatures. Referring to FIG. 8, carbon microsheets experienced irreversible capacity loss during the first cycle, which results from the unavoidable decomposition of electrolyte solution at lower potentials leading to the formation of SEI. At a current density of C/10 high temperature treated sample CS-900 and low temperature sample CS-500 exhibited an irreversible capacity loss of 44.5 and 51.5%, respectively. Such capacity losses that are common for high surface area carbonaceous anode materials have been previously ascribed to the SEI formation, and reaction with surface impurities such as hydrogen. Since the low temperature processed carbon sheets have low surface area, their increased irreversible capacity loss can be attributed to the presence of surface adsorbed hydrogen moieties or surface defects resulting from the decomposition of carbohydrate. From an electrochemistry stand point, an ideal rechargeable Li-ion battery should have very low (<15%) irreversible capacity. Surface treatment of the carbon microsheets can reduce the irreversible capacity loss.

Figure 9:
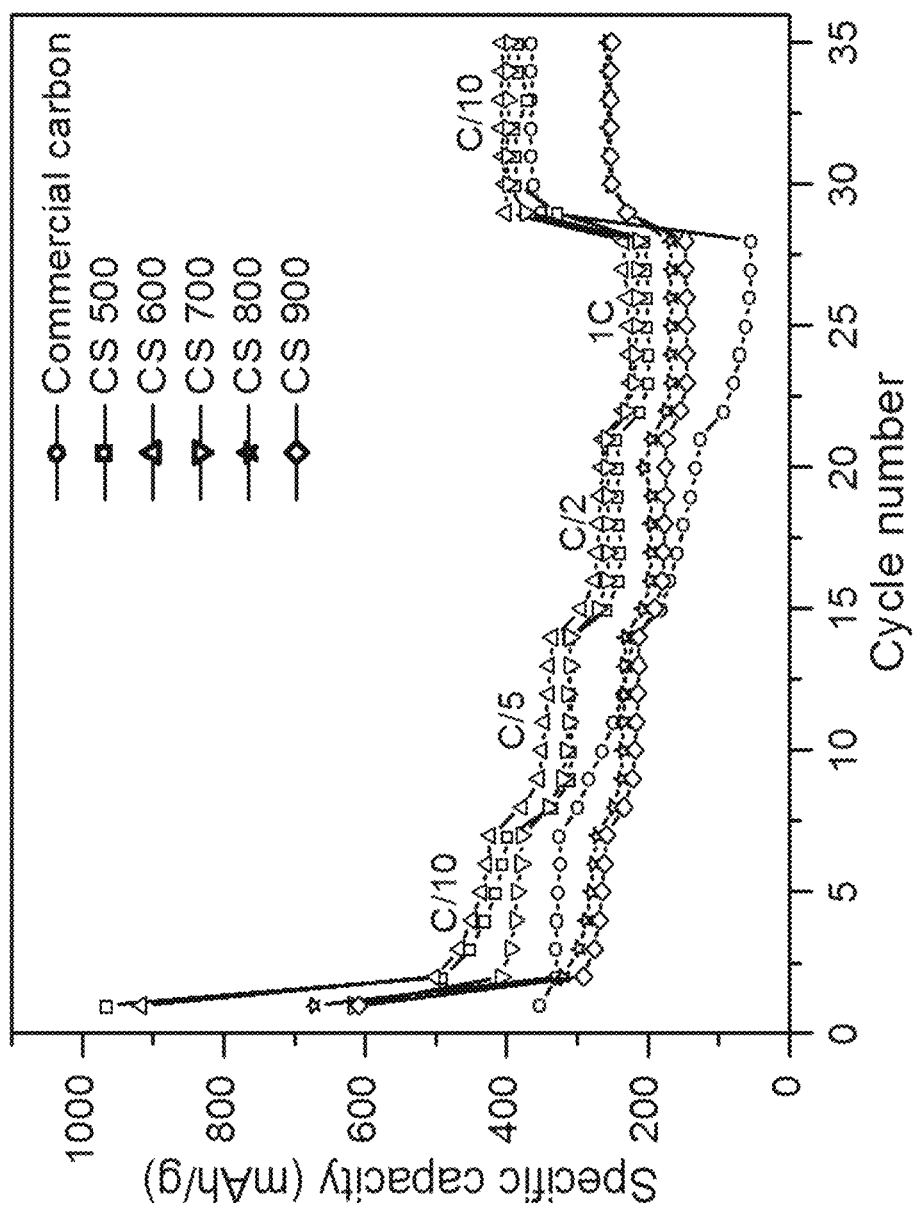
FIG. 9 shows electrochemical rate performance of carbon microsheets prepared at various temperatures and commercial carbon at various current densities.
Figure 10:
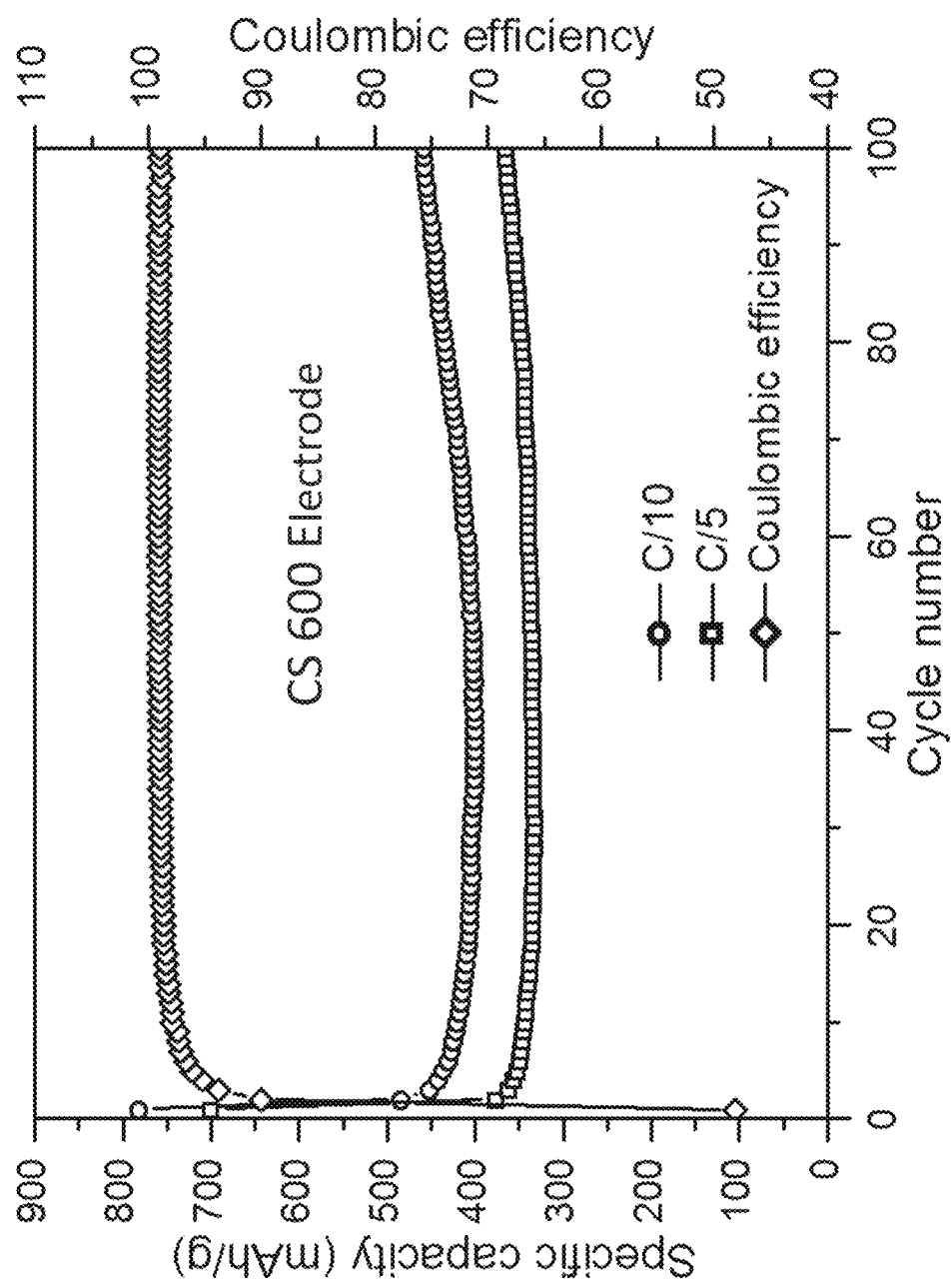
FIG. 10 shows galvanostatic cycling performance of the most active carbon microsheet (CS 600) at various current densities.

FIG. 9 shows electrochemical rate performance of carbon microsheets prepared at various temperatures and commercial carbon at various current densities. Referring to FIG. 9, electrochemical rate performances of the carbon sheets CS-500, CS-600, and CS-700 are presented, which are superior to those of commercial carbon. Whereas the sheets prepared at higher temperatures of 800, and 900° C. exhibited reduced specific capacities. For instance, at a current density of 0.1 C, the most active carbon microsheet electrode CS-600 demonstrated a specific capacity of 410 mAh/g, which is superior to the 350 mAh/g of commercial carbon anode. However, with an increase in current density, all carbon electrodes, especially the commercial graphite anode experienced substantial capacity loss. At a higher current density of 1C, CS-600 showed a specific capacity of 250 mAh/g, which is 4-fold higher than those of the commercial carbon (60 mAh/g). This is due to facile Li-ion diffusion into the plate/sheet like carbon particles. Subsequent long-term galvanostatic cycling of the same sample at current densities of C/10 and C/5 illustrated excellent capacity retention. FIG. 10 shows galvanostatic cycling performance of the most active carbon microsheet (CS 600) at various current densities. Referring to FIG. 10, after 100 charge-discharge cycles CS-600 retained a specific capacity of 450 at C/10 rate, and 360 mAh/g at C/5 rate, both the capacities being notably higher than those of commercial carbon anodes under similar experimental conditions.

Figure 11:
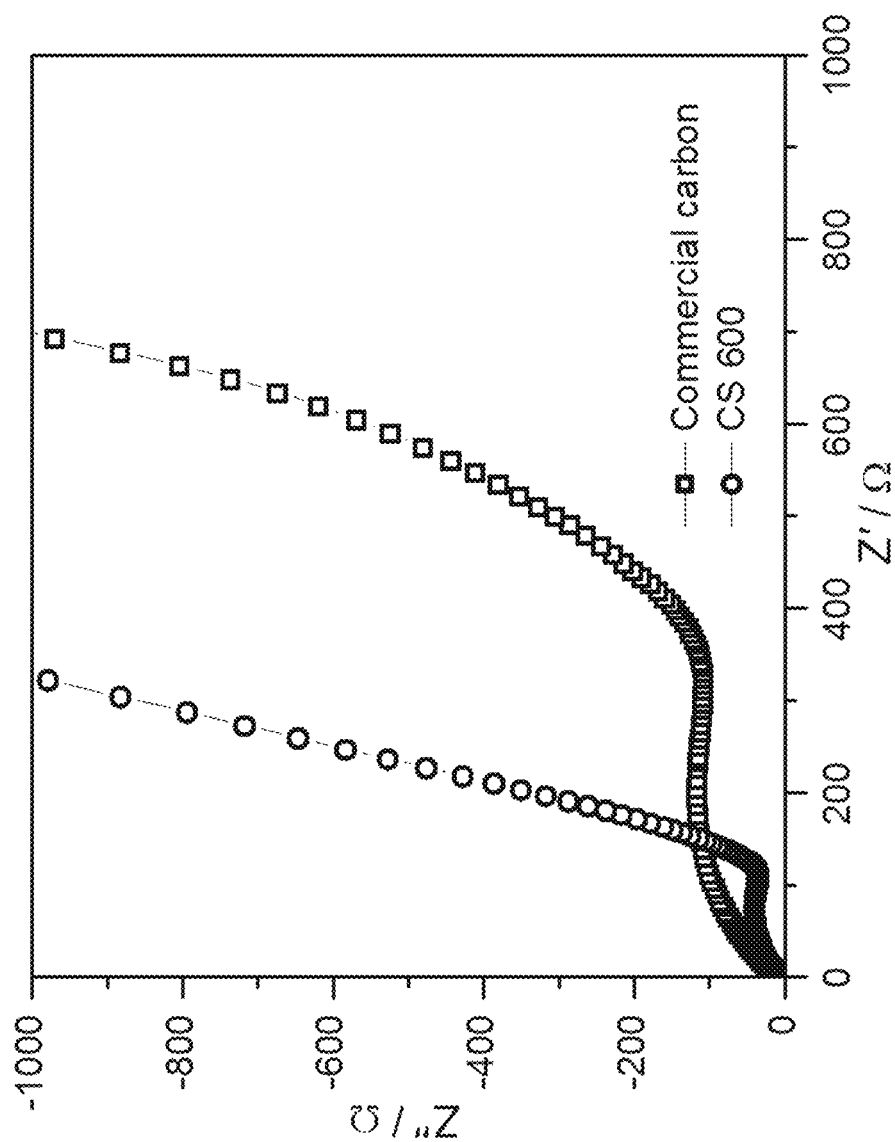
FIG. 11 shows electrochemical impedance spectroscopy of CS 600 and commercial carbon in Li-ion half-cell configurations.

Electrochemical impedance analysis was performed to obtain further insight on the superior electrochemical performance of carbon microsheets. FIG. 11 shows electrochemical impedance spectroscopy of CS 600 and commercial carbon in Li-ion half-cell configurations. Both carbon microsheets (CS-600) and commercial standard graphitic carbon samples exhibited sloping line in the low frequency region, and a single semicircle in the high frequency part of the EIS spectra. These electrochemical responses correspond to the solid-state diffusion of lithium ions, and charge transfer resistance, respectively. Smaller diameter of the semicircle in the initial stage of the curve for CS 600 relative to the initial stage of the curve for commercial carbon indicates lower solid-state diffusion.

Figures 12A, 12B:
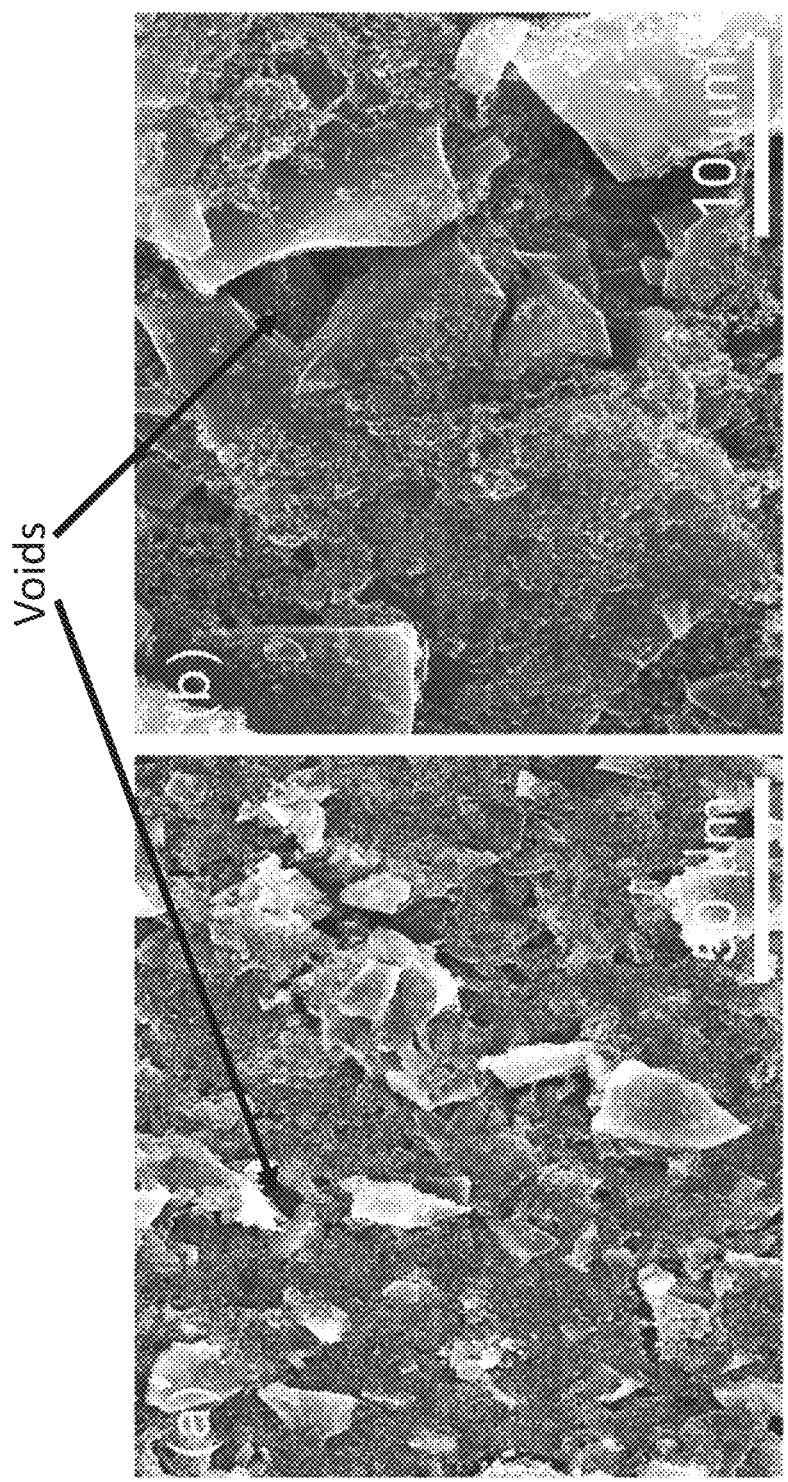
FIGS. 12 A and 12 B show SEM images of CS-600 electrode before galvanostatic cycling at different magnifications.
Figure 13:
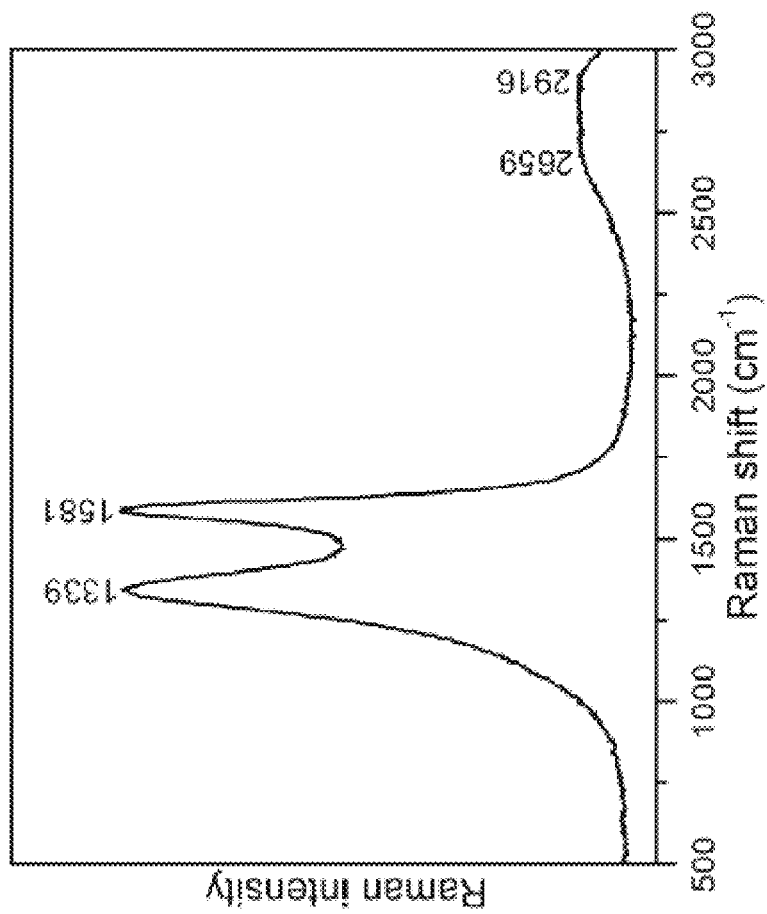
FIG. 13 shows Raman spectra of CS-600 composite electrode before galvanostatic cycling of a Li-ion half-cell.
Figure 14:
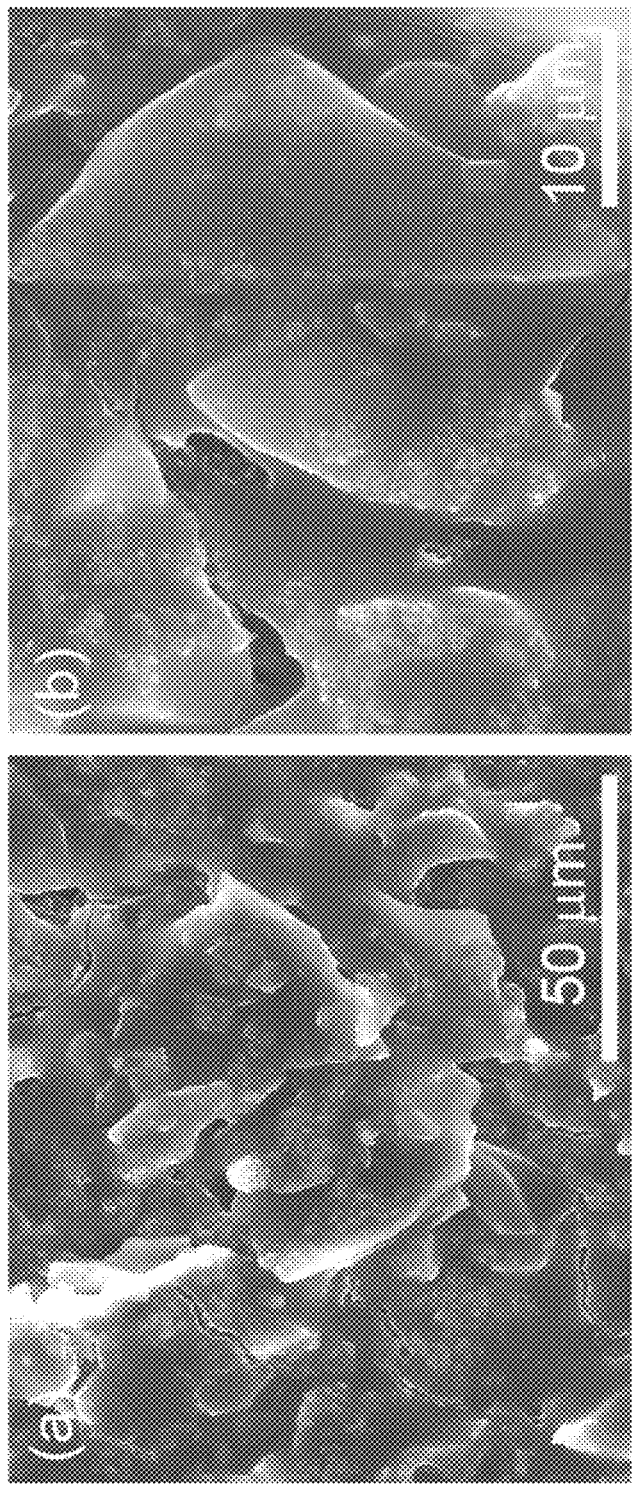
FIGS. 14 A and 14B show SEM images of CS-600 electrode after galvanostatic cycling at different magnifications.
Figure 15:
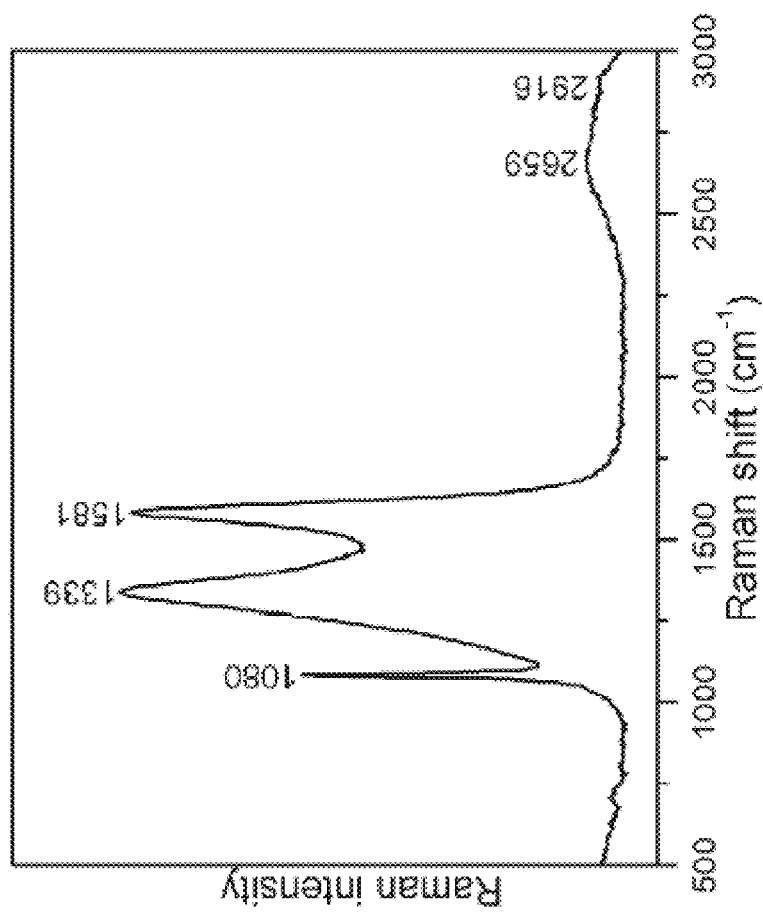
FIG. 15 shows Raman spectra of CS-600 composite electrode after galvanostatic cycling of a Li-ion half-cell.

In order to investigate the effect of Li-intercalation on the electrode microstructure, SEM analysis and Raman spectral analysis of the pristine and cycled electrode were performed. FIGS. 12 A and 12 B show SEM images of CS-600 electrode before galvanostatic cycling art different magnifications. Referring to FIG. 12A, the electrode contains carbon microsheets connected together by super-P nanoparticles and PVDF (polyvinyl diflouride) binder. Micron-sized voids can be seen in both FIG. 12A and FIG. 12B. FIG. 13 shows Raman spectra of CS-600 composite electrode before galvanostatic cycling of a Li-ion half-cell. FIGS. 14 A and 14B show SEM images of CS-600 electrode after galvanostatic cycling at different magnifications. FIG. 15 shows Raman spectra of CS-600 electrode after galvanostatic cycling of a Li-ion half-cell. For both pristine and cycled carbon electrodes, D and G bands appeared at Raman shifts of 1339 and 1581 cm$^{-1}$ respectively. Referring to FIGS. 13 and 15, intensity of the Raman D-peak slightly reduced after cycling. An additional peak corresponding to the carbonate groups of SEI components (mainly $Li_2CO_3$ and $RCO_2Li$ formed in alkyl carbonate based electrolyte solution) emerged at a Raman band at 1080 cm$^{-1}$ in FIG. 15. Referring to FIGS. 14A and 14B SEM images of the cycled electrodes are identical to the pristine electrodes, the only difference being the formation of a thin SEI film. These results clearly illustrated the structural and phase stability of carbon microsheets during prolonged charge—discharge cycles.

Significantly improved electrochemical performance of carbon microsheets can be explained by their 2-D microstructure and porosity. As mentioned earlier, amorphous and hard carbons are capable of storing more Li-ions compared to conventional graphitic anodes. Recent studies also confirmed the Li-ion storage in micropores of hierarchical carbon spheres. Consequently, we attributed the improved specific capacity of carbon microsheets to the additional Li-ion storage in the approximately 2 nm-sized pores and disordered interlayers. A composite electrode includes porous 2-D microsheets with spherical carbon particles (super P) improves electrical conductivity and the agglomeration of active material. Micron-sized voids between the individual microsheets enables the accommodation of volume changes (less than 10%) during lithiation-delithiation process, and improved contact with the electrolyte solution. Additionally, 2-D microstructure of carbon microsheets resulted in superior solid-state diffusion of lithium ions. Moreover, higher-degree of porosity facilitate superior electrolyte contact, which reduce the interfacial charge transfer resistance. Thus it can be concluded that Li-ion storage in micropores, and disordered graphitic planes resulted in capacity exceeding the theoretical limit of 372 mAh/g. Porous and 2-D microstructure cause improved rate performance due to reduced charge transfer and solid-state diffusion of Li-ions. The inexpensive and scalable synthesis, and superior electrochemical performance compared to commercial graphitic carbon anodes make the carbon microsheets excellent anode material for rechargeable Li-ion batteries. Electrochemical studies of the carbon microsheets in a Li-ion full-cell (containing a high-capacity cathode), and Na-ion half cells will lead to greater understanding and applications.

Figure 16:
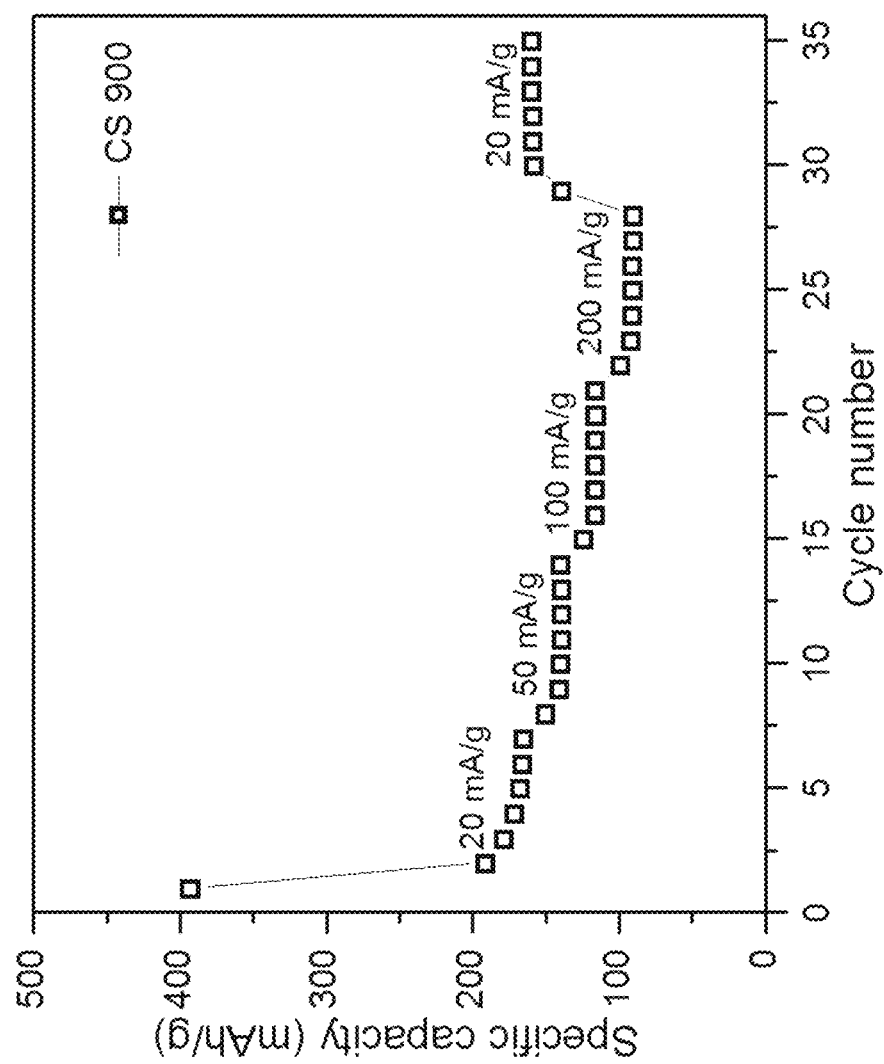
FIG. 16 shows galvanostatic rate performance of carbon microsheets prepared at 900° C. in a Na-ion half-cell.
Figure 17:
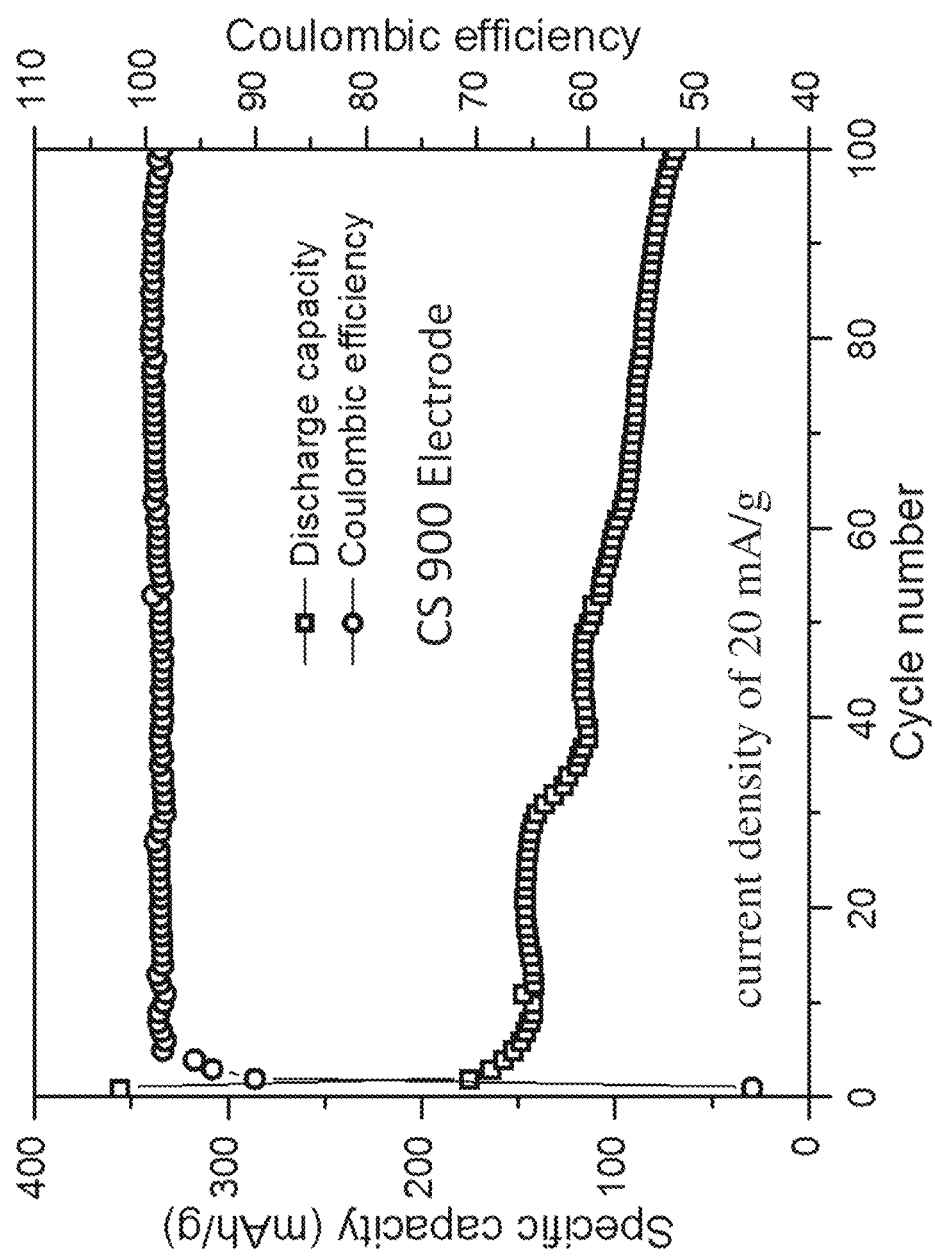
FIG. 17 galvanostatic cycling performance (at a current density of 20 mA/g) of CS-900 carbon microsheets in a Na-ion half-cell.
Figure 18:
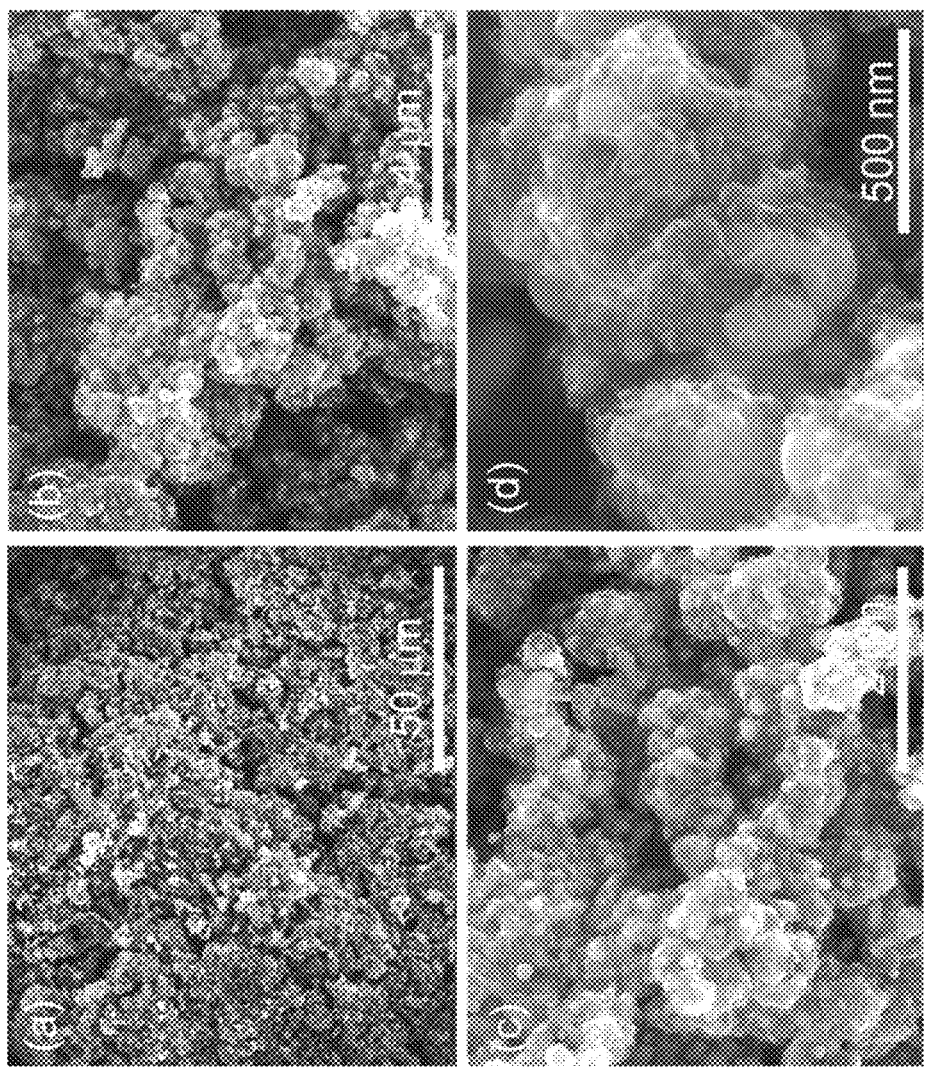
FIG. 18 shows SEM images of polystyrene based packing peanut derived carbon metal-nanoparticle composite at various magnifications.

Carbon microsheets (CS-900) exhibited good electrochemical performance in a Na-ion half-cell. FIG. 16 shows rate performance of CS-900 carbon microsheets. FIG. 17 shows galvanostatic cycling performance (at a current density of 20 mA/g) of CS-900 carbon microsheets (CS 900 electrode) in a Na-ion half-cell. At a current density of 20 mA/g, initial and second discharge capacity of 390, and 190 mAh were observed. After 3 charge-discharge cycles, these carbon anodes achieved a coulombic efficiency of 98%. They also showed reasonable long-term cycling stability.

In this disclosure a synthetic method to prepare carbon nanoparticles from polystyrene based packing peanuts is also described. Referring to FIG. 1B, 130 represents polystyrene based peanuts which are converted to a metal—nanoparticle carbon composite by a process which includes a heating step in an inert atmosphere. In FIG. 1, a preferred heating temperature range of 500-900° C. is illustrated and argon is indicated as the inert atmosphere. The method of producing a metal-nanoparticle composite includes the steps of providing a quantity of polystyrene-based packing peanuts, dissolving the polystyrene-based packing peanuts into an organic solvent. Providing a metal-organic catalyst containing a metal, the metal-organic catalyst being capable of catalyzing conversion of polystyrene-based packing peanuts into carbon nanoparticles in presence of heat, forming an admixture of the quantity of polystyrene-based packing peanuts and the catalyst, heating the admixture to a temperature in the range of 300-1000° C. for a heating time period in an inert atmosphere, resulting in a carbon-metal entity containing the metal, and cooling the carbon-metal composite to room temperature, resulting in a metal-nanoparticle carbon composite. In this disclosure a metal-nanoparticle carbon composite may sometimes be referred to as metal-carbon nanoparticle composite, sometimes designated as CNP. It is to be understood that these two references mean the same thing, namely, a composite material comprising a metal and carbon nanoparticles. For purposes of this disclosure room temperature can be understood to be in the non-limiting range of 20-35° C. Instead of argon, an inert atmosphere can be used. Non-limiting examples of inert atmosphere suitable for this purpose include argon, nitrogen, and helium. In one preferred embodiment of the method, synthesis of carbon-nanoparticle composite involved the thorough mixing of polystyrene based packing peanut and cobalt acetate (act as catalyst) in acetone followed by drying at 80° C. for 1 h. The solid formed was then heat treated at 800° C. for 2-5 h under argon at a heating rate of and 10° C./min cooling 9 to room temperature) rate of 10° C./min. The product obtained (identified as carbon nanoparticle composite CNP) was ground well for characterization and electrochemical studies. In the above method the metal-organic catalyst is formed by mixing a salt of a transition metal into an organic solvent. Non-limiting examples of such a transition metal include cobalt and nickel. FIGS. 18A through 18D show SEM images of carbon metal-nanoparticle composite derived from polystyrene-based packing peanut by the above method and conditions described above using cobalt acetate as catalyst at various magnifications. The surface area of metal-nanoparticle carbon composite produced by the above method and conditions described above using cobalt acetate as catalyst can have surface area in the range of 10 m$^2$/g-400 m$^2$/g. A preferred range for this surface area is 100 m$^2$/g-400 m$^2$/g based on experimental measurement, depending on the characteristics of the starting polystyrene-based peanuts material and processing conditions. It is further discovered in the studies leading to this disclosure that the metal-nanoparticle carbon composite has entities of a metal-core and an amorphous carbon shell.

The method of producing metal-nanoparticle carbon composite can include one or more of the following additional steps: 1) heating the metal-nanoparticle carbon composite to a temperature of 1000-2800° C. in an inert atmosphere for a time period in the range of 1-5 hours, resulting in graphitic carbon having a surface area in the range of 5-200 m$^2$/g. 2). In this heating step usually metal will be molten and boil above the boiling point, creating hollow carbon architecture; 2) heating the metal-nanoparticle carbon composite to a temperature in the range of 200-350° C. in air for a time period in the range of 1-36 hours, resulting in the metal-nanoparticle carbon composite having a surface area in the range of 100-2000 m$^2$/g; 3) heating the metal-nanoparticle carbon composite to a temperature in the range of 600-1000° C. in an inert atmosphere in the presence of an amount of potassium hydroxide catalyst for a time period in the range of 2-40 hours, resulting in a metal/metal oxide-nanoparticle carbon composite having a surface area in the range of 500-4000 m²/g. The formation of metal oxide in this step using potassium hydroxide is due to partial or total oxidation of the metal due to the presence of hydroxide at these high temperatures. In this heating step, a preferred range for the ratio of the amount of carbon in the metal-nanoparticle carbon composite to the amount of potassium hydroxide catalyst in the range of 1 to 20 by weight. Increase in concentration of KOH increases its reactivity with available carbon producing higher surface area.

Figure 19:
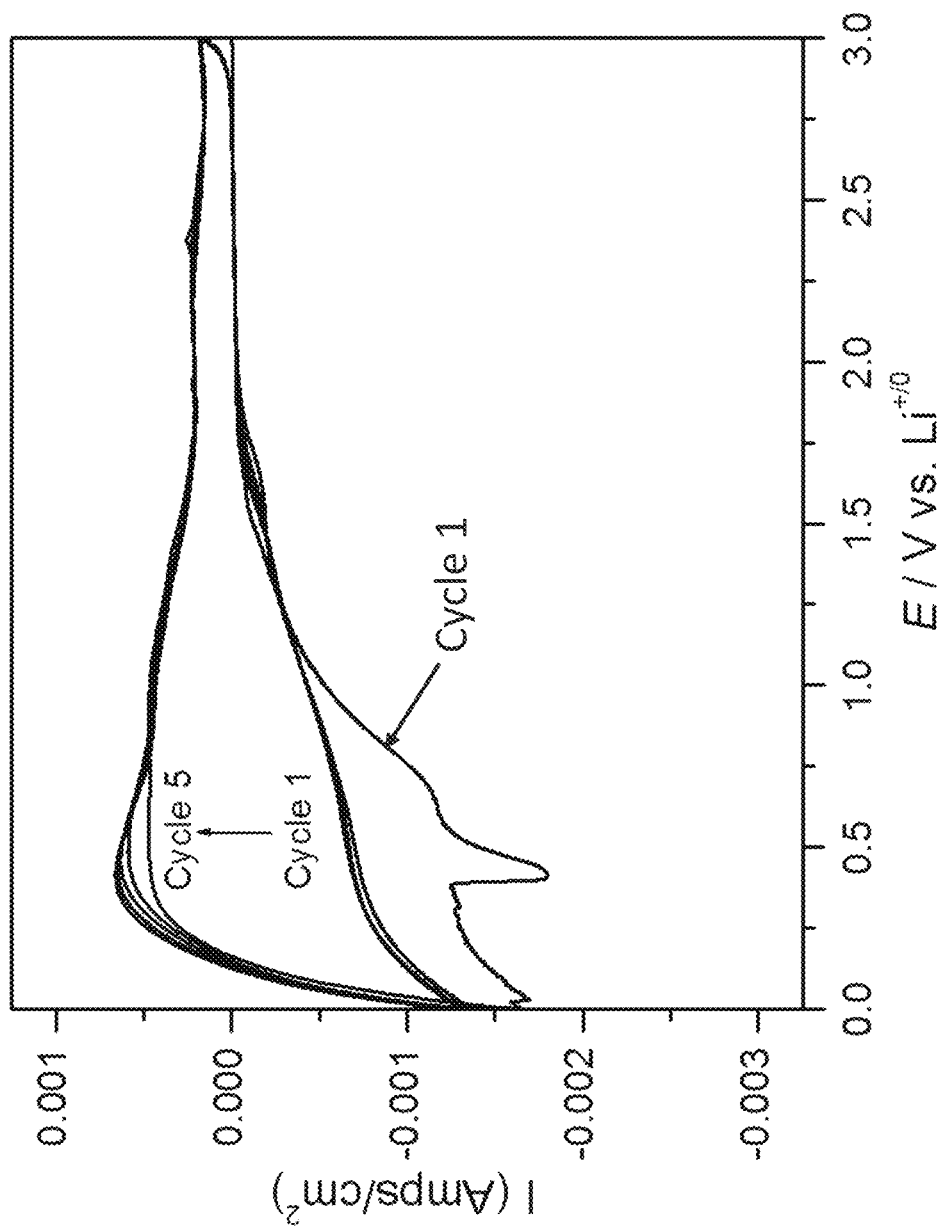
FIG. 19 shows cyclic voltammetry of metal-nanoparticle carbon composite in a Li-ion half-cell.
Figure 20:
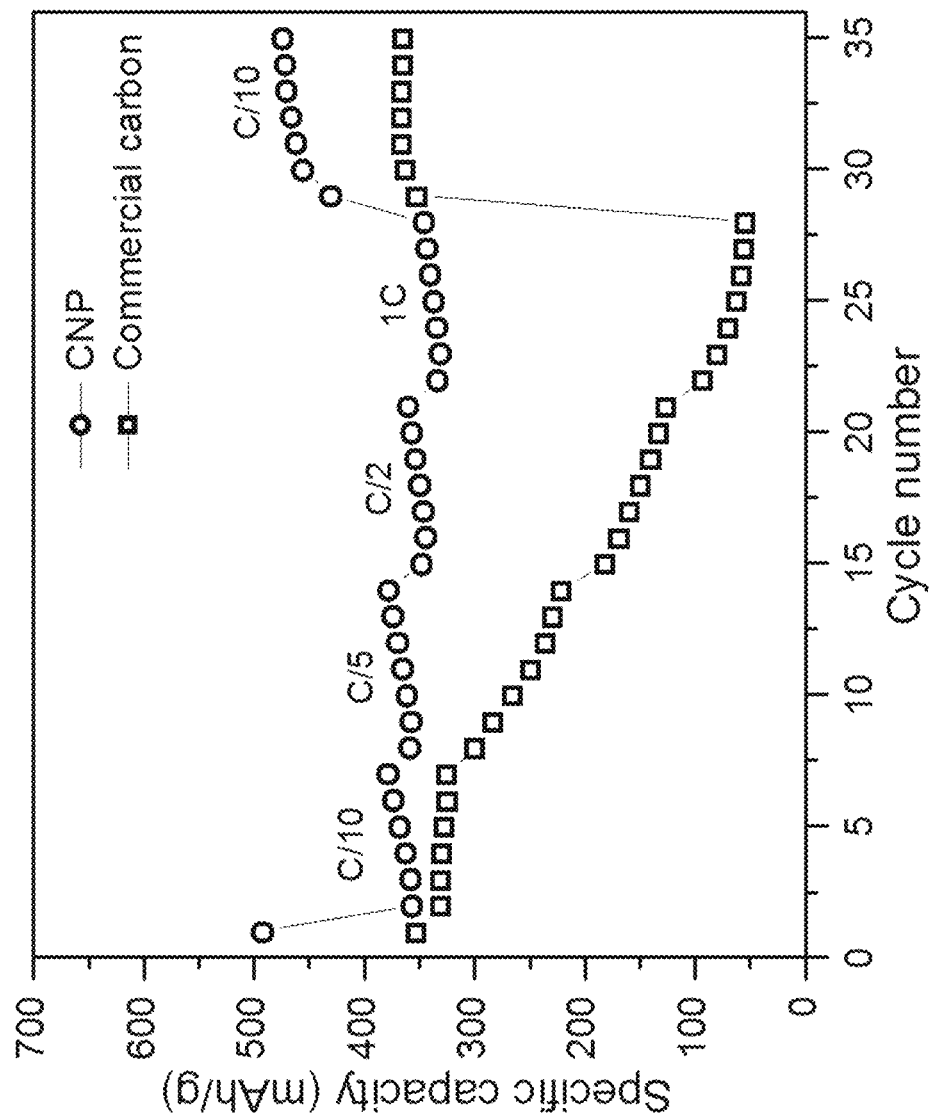
FIG. 20 shows rate performance of metal-nanoparticle carbon composite and commercial graphitic carbon at various current densities in a Li-ion half-cell.
Figure 21:
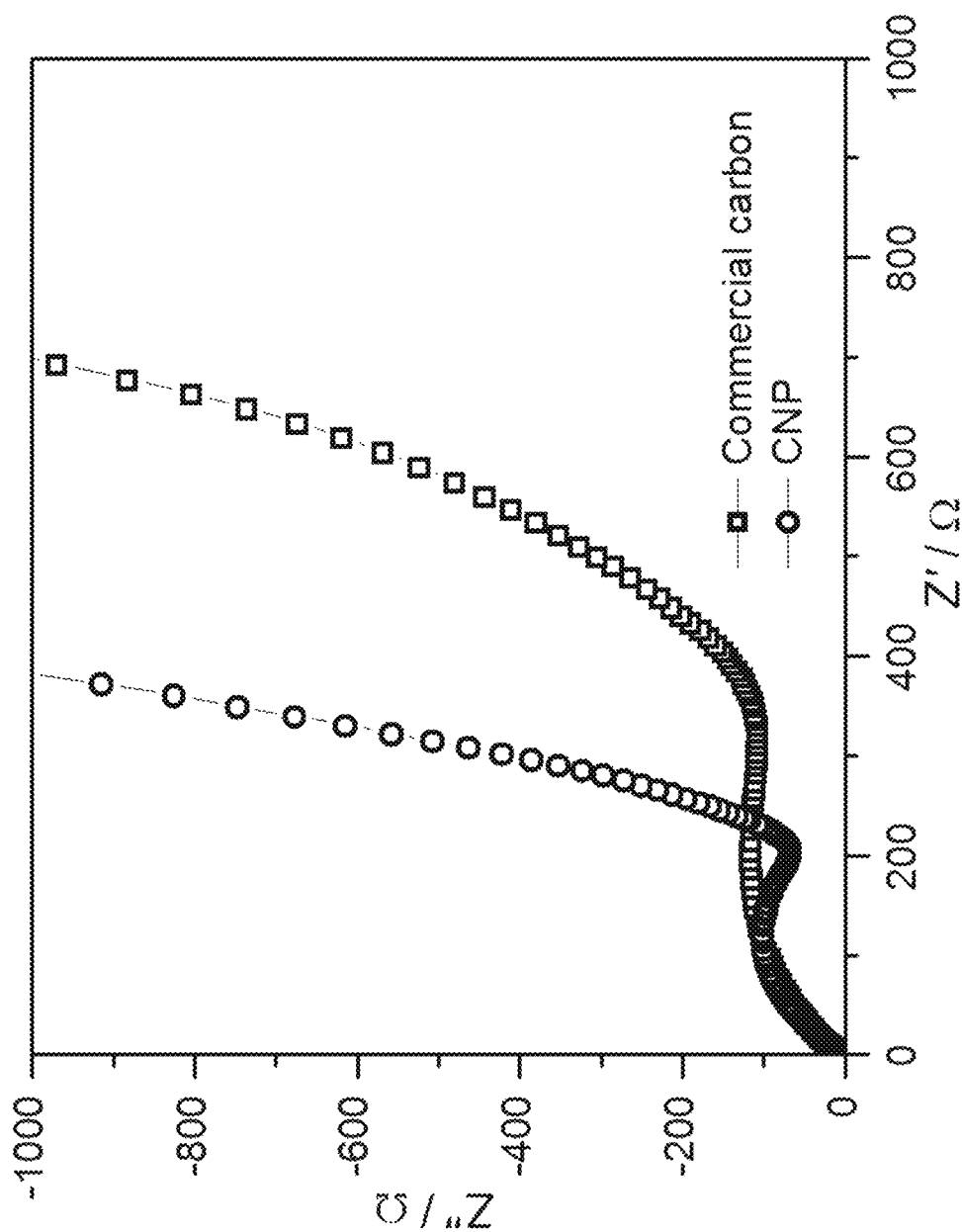
FIG. 21 shows EIS spectra of carbon nanoparticles and commercial graphitic carbon in a Li-ion half-cell.

Cyclic voltammetric analysis of the Li-ion half cells were performed to investigate the electrochemical response of electrodes made from metal-nanoparticle carbon composite. FIG. 19 shows cyclic voltammetry of metal-nanoparticle carbon composite in a Li-ion half-cell. FIG. 20 shows rate performance of metal-nanoparticle carbon composite at various current densities in a Li-ion half-cell. FIG. 21 shows EIS spectra of carbon nanoparticles and commercial carbon in a Li-ion half-cell. Referring to FIGS. 19 through 21, first cathodic scan represents the formation of an SEI on the carbon nanoparticle surface. Further cathodic, and anodic scans include broad bands in the 1.75-0V range that are characteristic of reversible Li-ion intercalation. They also demonstrated excellent rate performance, and 325 mAh/g was retained even at a high rate of 1C, which is 5-fold higher than those of commercial carbon anodes.

Figure 22:
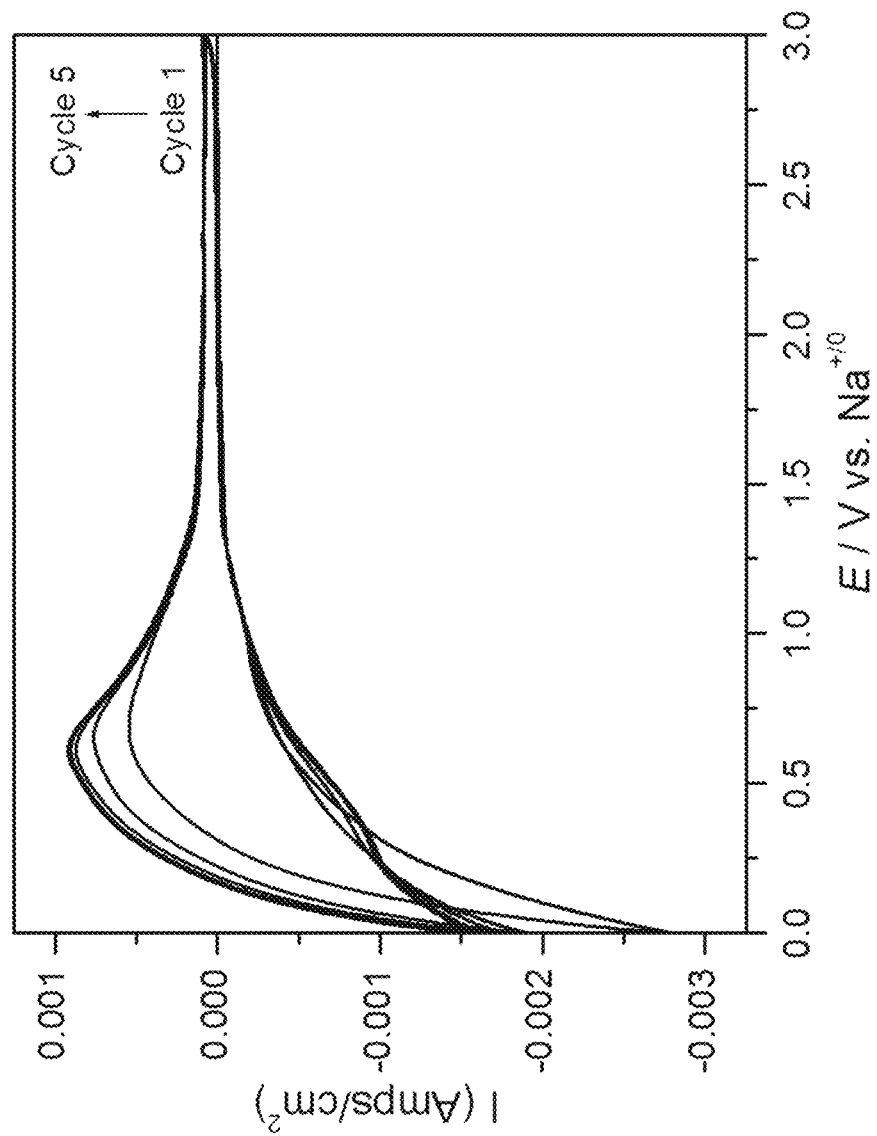
FIG. 22 shows cyclic voltammetry of metal-nanoparticle carbon composite s at various current densities of carbon nanoparticles in a Na-ion half-cell.
Figure 23:
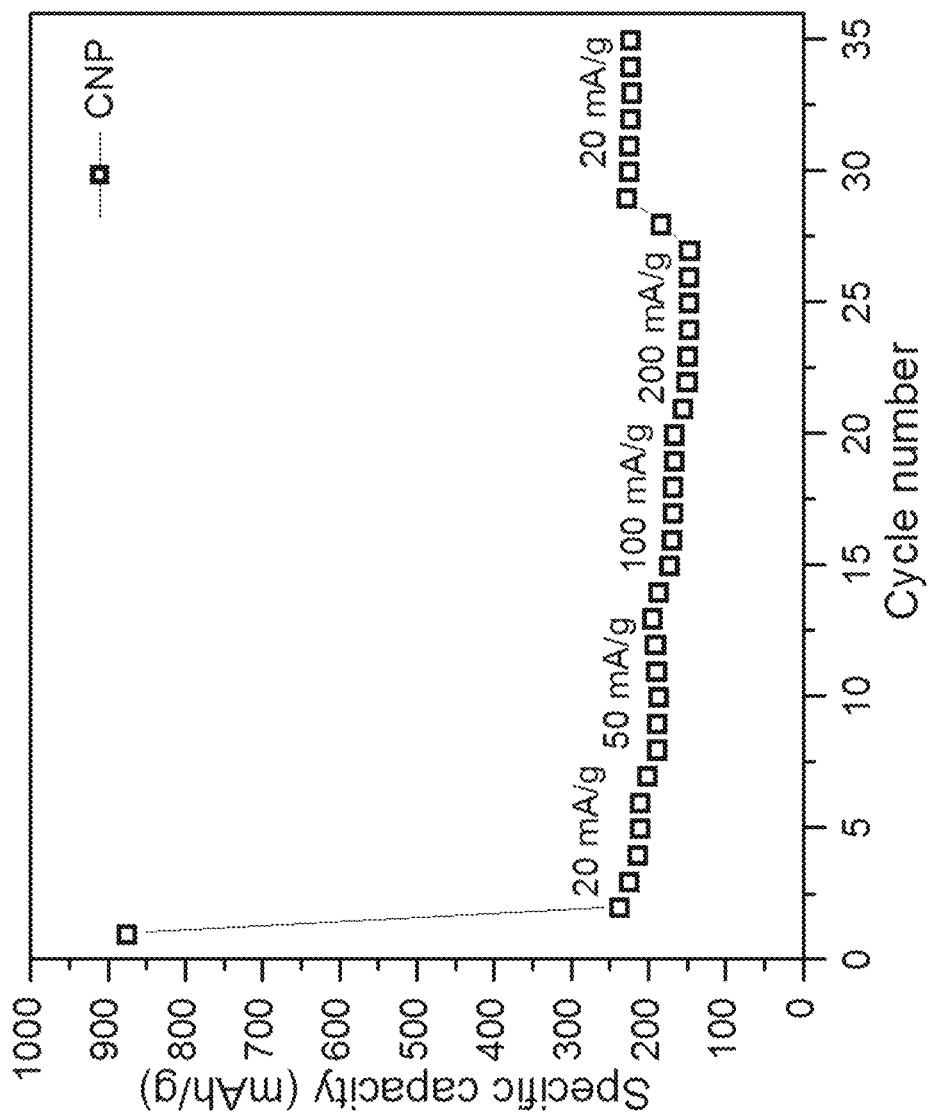
FIG. 23 shows rate performance of metal-nanoparticle carbon composite at various current densities in a Na-ion half-cell.

FIG. 22 shows cyclic voltammetry of metal-nanoparticle carbon composite s at various current densities of carbon nanoparticles in a Na-ion half-cell. FIG. 23 shows rate performance of metal carbon nanoparticle composite at various current densities (indicated in the figure in mA/g) of carbon nanoparticles in a Na-ion half-cell. Referring to FIGS. 22 and 23, EIS results proved that improved solid-state and interfacial Li-ion diffusion is responsible for the superior electrochemical performance (especially the rate performance) of metal-nanoparticle carbon composites derived from polystyrene-based peanuts. These metal carbon nanoparticle composite electrodes also showed reversible Na-intercalation and good rate performances.

Figure 24:
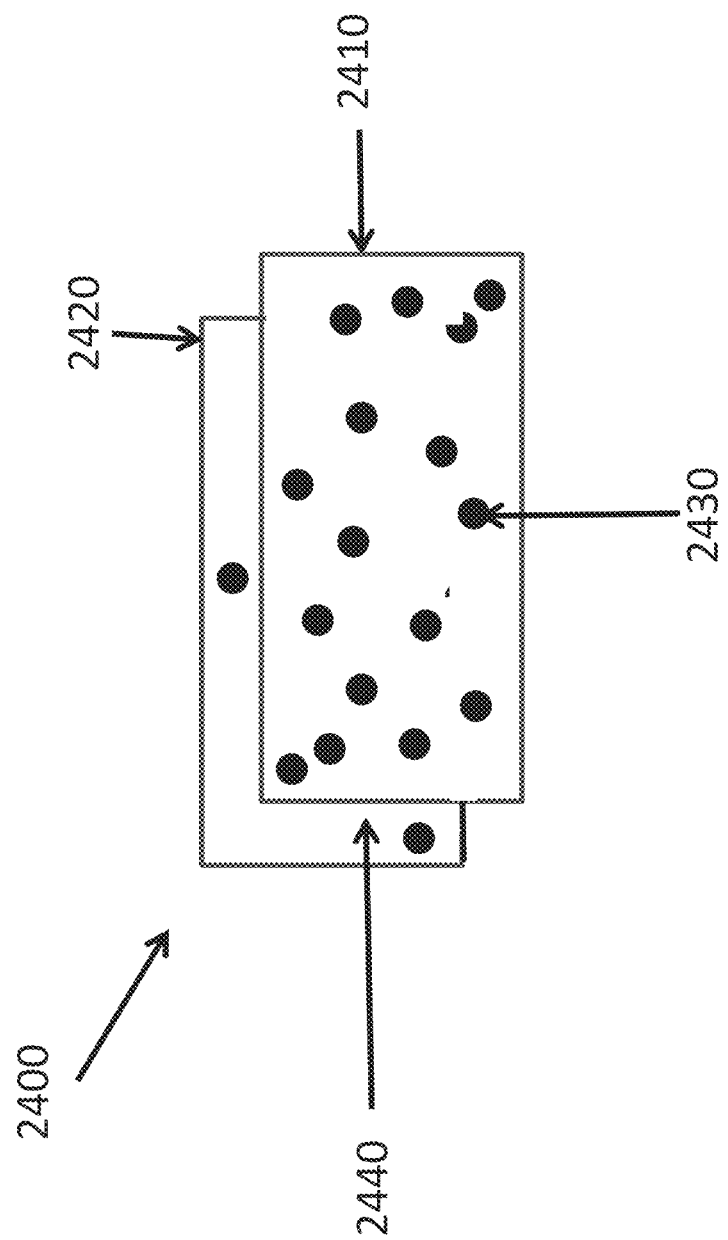
FIG. 24 is a schematic representation of the carbon microsheets of this disclosure formed from the starch-based packing peanuts utilizing the appropriate methods of this disclosure.
Figure 25:
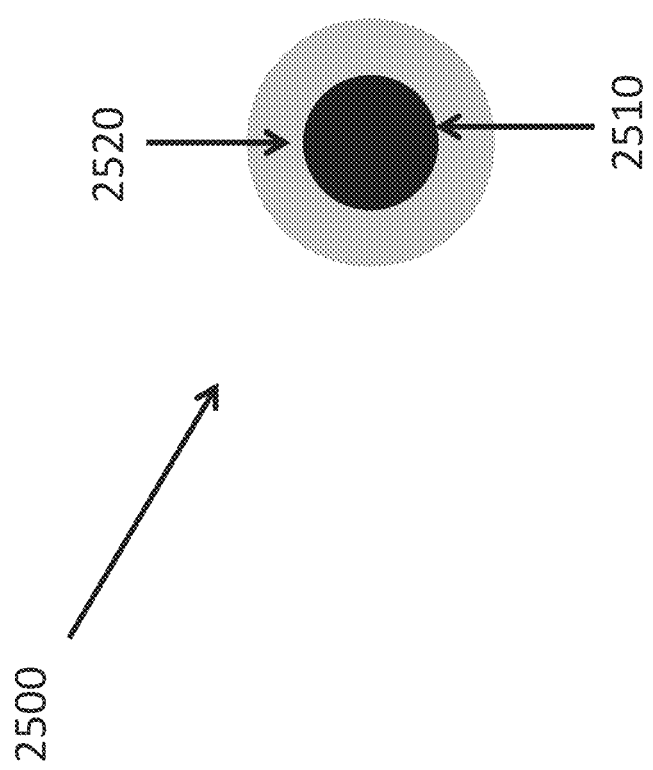
FIG. 25 is a schematic representation of one metal particle 2500 surrounded by shell of an amorphous carbon contained in a metal-nanoparticle carbon composite of this disclosure.

An important aspect of this disclosure is the structure of the electrodes of this disclosure. FIG. 24 is a schematic representation of the carbon microsheets of this disclosure formed from the starch-based packing peanuts utilizing the appropriate methods of this disclosure. Referring to FIG. 24, which is not to scale, 2400 shows two successive carbon microsheets. In FIGS. 24, 2410 and 2420 are two successive carbon microsheets of this disclosure in a stack of carbon microsheets of this. Micropores in a carbon microsheet are represented as dark circles 2430 and interlayer porosity is represented as 2440. FIG. 25 is a schematic representation of one metal particle 2500 surrounded by shell of an amorphous carbon contained in a metal-nanoparticle carbon composite of this disclosure, made from polystyrene-based packing peanuts utilizing the appropriate methods of this disclosure. Referring to FIG. 25, a unit of the metal-nanoparticle carbon composite of this disclosure is represented by a core-shell structure where in 2510 represents a metal particle core surrounded by a shell 2520 comprising amorphous carbon. The dimensions of the metal core 2510 can be in the non-limiting range of 10-30 nm, while the size of the carbon shell can be in the non-limiting range of 2-30 nm. Due to aggregation of particles and the, the total size of a metal core-carbon shell structure of the composite can vary in the non-limiting range of 10-80 nm. Its hauled be noted that in FIG. 25, the metal core and carbon shell are shown as spherical which is e a reasonable approximation based on the scanning electron microscopy (SEM) and transmission electron microscopy (TEM) studies. Further, SEM and TEM studies indicated both the carbon microsheet structure shown in FIG. 24 and the metal core-carbon shell structure shown in FIG. 25.

Thus in this disclosure, carbon microsheets and nanoparticles are synthesized through upcycling of starch and polystyrene based waste packing peanuts. Electrodes composed of these carbonaceous materials exhibited excellent Li, and Na-ion storage performances (specific capacities, rate performance, and long-term cycling stability) compared to commercial carbon anodes. Amorphous nature of these carbon electrodes resulted in a superior specific capacity of 410 mAh/g, which greater than the theoretical capacity of carbon (372 mAh/g). Superior electrochemical properties are attributed to the unique 2-D and 1-D architectures with optimum porosity and amorphous nature that allows improved solid-state and interfacial Li-ion diffusion kinetics. Microscopic and spectroscopic investigation of the cycled electrodes proved that the microstructures responsible for superior electrochemical performances are preserved after many charge-discharge cycles. The synthetic methods described in this disclosure are relatively inexpensive, environmentally benign, and scalable, compared to complex conventional methods used for the synthesis of carbonaceous materials.

Based on the studies described above leading to this disclosure, it is an objective of this disclosure to disclose an electrode suitable for use as an electrode in an electrochemical energy storage cell, wherein the electrode contains an amorphous carbon structure comprising a plurality of interconnected layered porous carbon sheets. A non-limiting upper value for the thickness of layered porous carbon sheets of such an electrode is 3 μm while a non-limiting upper limit for the width of the carbon sheets comprising the electrode is 200 μm. Further, the amorphous porous layered carbon sheets of such an electrode can have a surface area in the range of 10 m²/g-4000 m²/g. Further, based on the experiments leading to this disclosure, these electrode can have a specific capacity in the range of 300-600 mAh/g. The term specific capacity is well understood by those of ordinary skill in the art.

It is another objective of this disclosure to disclose an electrode, based on the studies and methods described above, suitable for use as an electrode in an electrochemical energy storage cell, wherein the electrode contains graphitic carbon structure with a surface area in the range of 5-200 m²/g.

It is yet another objective of this disclosure to disclose, based on the detailed description of studies described above, An electrode suitable for use as an electrode in an electrochemical energy storage cell, wherein the electrode contains a metal-nanoparticle carbon composite comprising metal core-carbon shell like architecture and an amorphous structure. Further, the electrode of this disclosure with a metal core-carbon shell like architecture has a surface area in the range of 5-4000 m²/g. Methods to obtain such a wide range of surface area have been described in detail in the above detailed description section of this disclosure. The electrode of this disclosure comprising a metal-nanoparticle carbon composite with a metal core-carbon shell like structure can have a specific capacity in the range of 300-600 mAh/g, based on the studies leading to this disclosure.

It is also an objective of this disclosure to disclose an electrochemical storage cell, such as but not limited to a Li-ion battery, that utilizes an electrode containing an amorphous carbon structure comprising a plurality of interconnected layered porous carbon sheets.

It is yet another an objective of this disclosure to disclose an electrochemical storage cell, such as but not limited to a Li-ion battery, that utilizes an electrode containing contains graphitic carbon structure with a surface area in the range of 5-200 $m^2/g$.

It is also an objective of this disclosure to disclose an electrochemical storage cell, such as but not limited to a Li-ion battery, that utilizes an electrode containing a metal-nanoparticle carbon composite comprising metal core-carbon shell like architecture and an amorphous structure.

Thus in this disclosure, an environmental friendly, inexpensive, solid-state and scalable route is developed for the synthesis of 1-dimensional, 2-dimensional and 3-dimensional carbonaceous materials and architectures. The process use polystyrene and starch based packing peanuts (as a feedstock and a carbon source), which is heat treated to 300-1000° C. under inert gas atmosphere. Further, packing peanut feedstock mixed with various s, p, and d block elements precursors and heat-treated to 50-1500° C. temperature in various reaction conditions yields a composite hybrid material. Morphology, structure and particle sizes of these materials can be further controlled by activation under $CO_2$ gas at 900° C. The unique architecture, texture, structure and high surface area of the obtained carbonaceous materials make them high-performance candidates for electrochemical energy storage including Li/Na-ion batteries, and supercapacitors. Conventionally; carbonaceous nanomaterials are synthesized through very complex and expensive methods with the requirement of plasma and reducing gases, which are difficult to scale-up. The methods and concepts described in this disclosure technology discussed herein provides for upcycling of discarded or unused starch-based peanuts and polystyrene-based peanuts to technologically useful carbon materials for energy storage.

It is possible to make various metal-carbon or metal oxide-carbon hybrid composites with the addition of various chemical precursors in the waste feedstock. The technology described herein allows development of functional carbon materials by using packing peanuts as precursors. Compared to the existing solutions, methods of this disclosure and electrodes made therefrom are cheaper and produces carbon materials with unique morphology and functional properties. The method also allows easy modification of the synthesized carbon with various metals, metal oxide and semiconductor nanoparticles. In the disclosed methods, starch based packing peanuts resulted in structurally tunable carbon sheets and polystyrene-based peanuts form nanoparticles. With the addition of catalytic materials with the feedstock, it leads to the formation of core-shell architectures. The carbonaceous material synthesized by the upcycling of packing peanuts demonstrated excellent electrochemical performance in Li-ion batteries (>350 mAh/g at C/10 rate), Na-ion batteries (>100 mAh/g at C/10 rate) and supercapacitors (>110 F/g at 5 A/g current).

Up-cycled carbon material is also a promising material as an additives for lubrication, can act as conducting carbon black for dissipating heat from tire-trade and inks for toners and printers.

Based on the principles and methods of this disclosure starch-based packing peanuts can be processed to produce carbon microsheets. Further, polystyrene-based packing peanuts can be processed utilizing the concepts and method of this disclosure to produce metal-nanoparticle carbon composites. It should be noted that it is an objective of this disclosure that the starch-based packing peanuts and polystyrene-based packing peanuts can be mixed in a desired proportion and processed by a combination of the process steps detailed for each of these starting materials. In this scenario, the carbonaceous product resulting will be a mix of carbon microsheets and metal-nanoparticle carbon composite. Electrodes can be made from such a mix of carbon microsheets and metal-nanoparticle carbon composite and those electrodes can be utilized in electrochemical energy storage cells, such as, but not limited to, Li-ion batteries. Alternatively, carbon microsheets and metal-nanoparticle carbon composites made separately can be mixed in a desired proportion to make an electrode. In either case, such hybrid carbonaceous material when homogenized can yield as anodes, for example in a lithium ion battery, capacities of 300-500 mAh/g based on the ratio of the different types of carbonaceous entities.

It is to be further recognized that in the above described methods of processing poly-styrene-based packing peanuts, instead of a metal-nanoparticle carbon composite, a metal-oxide carbon-nanoparticle carbon composite may be formed. Formation of metal oxide can occur due to presence of air and high temperature. It can also occur due to the presence of oxidizing agents such as potassium hydroxide. In some cases both metal-nanoparticle carbon composite and a metal-oxide nanoparticle carbon composite may be formed, their proportion depending on processing conditions. Electrodes can be made from such a mix of metal-nanoparticle carbon composite and a metal-oxide nanoparticle carbon composite, and those electrodes can be utilized in electrochemical energy storage cells, such as, but not limited to, Li-ion batteries.

While the present disclosure has been described with reference to certain embodiments, it will be apparent to those of ordinary skill in the art that other embodiments and implementations are possible that are within the scope of the present disclosure without departing from the spirit and scope of the present disclosure. Thus, the implementations should not be limited to the particular limitations described. Other implementations may be possible. It is therefore intended that the foregoing detailed description be regarded as illustrative rather than limiting. Thus, this disclosure is limited only by the following claims.

The invention claimed is:

1. A method of producing a metal-nanoparticle carbon composite, the method comprising:
   providing a quantity of polystyrene-based packing peanuts;
   dissolving the polystyrene-based packing peanuts into an organic solvent;
   providing a metal-organic catalyst containing a metal, the metal-organic catalyst being capable of catalyzing conversion of polystyrene-based packing peanuts into carbon nanoparticles in presence of heat;
   forming an admixture of the quantity of polystyrene-based packing peanuts dissolved in an organic solvent and the catalyst;
   heating the admixture to a temperature in the range of 300-1000° C. for a heating time period in an inert atmosphere, resulting in a carbon-metal entity containing the metal; and
   cooling the carbon-metal composite to room temperature, resulting in a metal-nanoparticle carbon composite, wherein metal particles are surrounded by shells made of amorphous carbon.

2. The method of claim 1, wherein the metal-nanoparticle carbon composite has a surface area in the range of 100 $m^2/g$-400 $m^2/g$.

3. The process of claim 1, further comprising the step of heating the metal-nanoparticle carbon composite to a temperature in the range of 1000-2800° C. in an inert atmosphere for a time period in the range of 1-5 hours, resulting in graphitic carbon having a surface area in the range of 5-200 m²/g.

4. The process of claim 1, further comprising heating the metal-nanoparticle carbon composite to a temperature in the range of 200-350° C. in air for a time period in the range of 1-36 hours, resulting in the metal-nanoparticle carbon composite having a surface area in the range of 100-2000 m²/g.

5. The process of claim 1, further comprising heating the metal-nanoparticle carbon composite to a temperature in the range of 600-1000° C. in an inert atmosphere in the presence of an amount of potassium hydroxide catalyst for a time period in the range of 2-40 hours, resulting in the metal-nanoparticle carbon composite having a surface area in the range of 500-4000 m²/g.

6. The method of claim 1, wherein the catalyst is a salt of a transition metal.

7. An electrode suitable for use as an electrode in an electrochemical energy storage cell, the electrode containing a metal-nanoparticle carbon composite wherein metal particles are surrounded by shells made of amorphous carbon.

8. The electrode of claim 7, wherein the metal-nanoparticle carbon composite comprising metal core-carbon shell like architecture has a surface area in the range of 5-4000 m²/g.

9. An electrochemical energy storage cell comprising the electrode of claim 7.

* * * * *